(12) United States Patent
Ganahl

(10) Patent No.: US 10,863,851 B1
(45) Date of Patent: Dec. 15, 2020

(54) CONTAINER WITH HEATING ASSEMBLY AND REMOVABLE POWER SOURCE MODULES

(71) Applicant: Joe Ganahl, Honolulu, HI (US)

(72) Inventor: Joe Ganahl, Honolulu, HI (US)

( * ) Notice: Subject to any disclaimer, the term of this patent is extended or adjusted under 35 U.S.C. 154(b) by 570 days.

(21) Appl. No.: 15/716,862

(22) Filed: Sep. 27, 2017

Related U.S. Application Data

(60) Provisional application No. 62/454,763, filed on Feb. 4, 2017.

(51) Int. Cl.
*A47J 27/21* (2006.01)

(52) U.S. Cl.
CPC ... *A47J 27/21033* (2013.01); *A47J 27/21091* (2013.01); *A47J 27/21175* (2013.01)

(58) Field of Classification Search
CPC .. A47J 31/005; A47J 36/2433; A47J 31/0626; A47J 36/2466; A47J 36/2483; A47J 39/025; A47J 41/005; A47J 27/2105; A47J 31/0576; A47J 41/0094; A47J 27/21041; A47J 27/21083; A47J 36/2416; A47J 36/2438; A47J 36/32; A47J 36/321; A47J 41/0044; A47J 2202/00; A47J 31/4417; A47J 31/4425; A47J 31/4457; A47J 31/5253; A47J 36/2411; A47J 36/2444; A47J 36/2472; A47J 36/2494; A47J 36/28; A47J 41/0038; A47J 43/042; A47J 2203/00; A47J 27/21075; A47J 27/21175; A47J 31/02; A47J 31/04; A47J 31/057; A47J 31/0615; A47J 31/106; A47J 31/20; A47J 31/303; A47J 31/36; A47J 31/3614; A47J 31/3676; A47J 31/401; A47J 31/404; A47J 31/42; A47J 31/50; A47J 31/52; A47J 31/521; A47J 31/54; A47J 36/20; A47J 36/2461; A47J 39/02; A47J 41/0016; A47J 41/0083; A47J 41/0088; A47J 42/50; A47J 42/54; A47J 43/046; A47J 43/0716
(Continued)

(56) References Cited

U.S. PATENT DOCUMENTS

| | | | |
|---|---|---|---|
| 8,618,448 | B2 | 12/2013 | Alexander |
| 8,759,721 | B1 | 6/2014 | Alexander |

(Continued)

FOREIGN PATENT DOCUMENTS

| | | |
|---|---|---|
| AU | 2011323416 B2 | 5/2012 |
| CN | 103430416 B | 1/2016 |

*Primary Examiner* — Serkan Akar
*Assistant Examiner* — Chris Q Lui
(74) *Attorney, Agent, or Firm* — Edmond DeFrank

(57) ABSTRACT

A container adapted to store and heat a liquid, such as water, or other content is presented herein. The container includes a main body including an interior portion and an at least partially open top end. A dual opening top cap is removably connected to the at least partially open top end of the body. Furthermore, a heating assembly is connected to a bottom end of the body. The heating assembly includes an at least partially exposed heating element that is adapted to be in direct contact with the fluid, beverage or other liquid contained within the body. In some embodiments, the heating assembly is adapted to and capable of heating the liquid and/or other contents contained with within the interior portion of the body to a boiling temperature.

16 Claims, 40 Drawing Sheets

(58) Field of Classification Search
USPC ....... 219/432, 435, 438, 441, 201, 387, 429,
219/433, 436, 521, 627; 99/280, 316,
99/283, 285, 286, 288, 302 R, 453, 483
See application file for complete search history.

(56) References Cited

U.S. PATENT DOCUMENTS

| | | |
|---|---|---|
| 8,905,252 B2 | 12/2014 | Latham et al. |
| 9,035,222 B2 | 5/2015 | Alexander |
| 9,782,036 B2 | 10/2017 | Alexander |
| 9,801,482 B1 | 10/2017 | Alexander et al. |
| 9,814,331 B2 | 11/2017 | Alexander |
| 9,863,695 B2 | 1/2018 | Alexander et al. |
| 2004/0211766 A1* | 10/2004 | Iannucci ............... A47J 41/005 219/438 |
| 2008/0041859 A1* | 2/2008 | Teglbjarg ............. A47J 36/2411 220/592.16 |
| 2011/0217589 A1* | 9/2011 | Kobayashi ............. H01M 2/02 429/174 |
| 2015/0182059 A1* | 7/2015 | Richardson ........... A47J 31/005 99/302 R |

* cited by examiner

CONTAINER WITH HEATING ASSEMBLY AND REMOVABLE POWER SOURCE MODULES

CLAIM OF PRIORITY/CROSS REFERENCE TO RELATED APPLICATION

The present application is based on and a claim to priority is made under 35 U.S.C. § 119(e) to provisional patent application Ser. No. 62/454,763, having a filing date of Feb. 4, 2017, the contents of which are incorporated herein in their entirety by reference.

FIELD OF THE INVENTION

The present invention is generally directed to a portable container for storing a beverage or other liquid content, and more specifically, to a beverage container with a heating assembly and one or more removably attachable power source modules. The power source modules can be used to provide power to the heating assembly in order to controllably heat the temperature of the contents of the beverage container.

BACKGROUND OF THE INVENTION

The need to hydrate is essential to human nature and carrying liquid allows hydration in diverse elements and conditions. An additional need exists to heat and/or boil liquids in a portable container that can easily be carried and which the contents can be consumed directly from the container. This can provide significant benefit for lifesaving, water purification, preparation of freeze dried food and warming liquids in cold weather, as just an example.

For instance, it is common to travel with coffee, tea or other hot beverage, however, oftentimes, it is difficult to maintain the temperate of the hot beverage for an ended period of time. While there are many insulated travel mugs and like containers, most do not offer the ability to heat the liquid within the container or otherwise expose the liquid to a heating element on-the-go.

Furthermore, in many instances, there is a need for boiling water, especially while camping, hiking or during other like outdoor activities. For example, boiling water can help remove contaminants for purposes of providing a safe potable liquid to drink. However, oftentimes, preparation of food items, including, but not limited to freeze dried food commonly brought on long-term camping or hiking activities, requires the addition of an amount of boiling water. In order to boil water in such a setting, users will often need to assemble a camp stove; or camp fire in order to provide the necessary heat.

Accordingly, there is a need in the art for a portable beverage container or travel mug that includes a heating assembly for selectively heating the contents of the container. It would be beneficial if the proposed heating assembly is able to maintain the temperate of the contents at a selected or predetermined temperature ranges, for example, in order to maintain the temperature of a hot beverage for extended periods e. In addition, it would be beneficial if the proposed heating assembly is also able to boil the contents of the container for a period of time, for example, in order to either reduce contaminants contained therein and/or for providing boiling water to prepare food items.

It would also be beneficial if the proposed beverage container or travel mug includes a simple device that allows for low cost production and is in the form of a compact size to maximize adoption and usage of the device and methods across a wide range of applications.

Further advantages of the proposed beverage container or travel mug may include one or heating elements powered via an onboard batter and/or one or re alternative power sources through external sources such as an AC or DC power cable.

It would also be beneficial if the proposed beverage container includes a cap with dual openings, one adapted for cold drinking/pouring, and another adapted for hot liquid drinking.

SUMMARY OF THE INVENTION

Accordingly, the present invention is generally directed to a container, such as a travel mug or other portable container adapted to at least temporarily retain liquid or other contents therein. The device and method for a water/liquid modular container and heating system provided herein offers a number of important advantages over currently available products and systems. The device and method of the present invention embodies a simple and reliable design that permits utilization and deployment not previously available. The device and method is designed to work with a wide variety of modular attachments in a manner not offered by alternative systems.

For instance, the modular beverage container of the present invention includes a main body portion, a cap, a heating assembly, and one or more modules, such as, but not limited to power source modules, storage modules, and/or blender or coffee grinder modules. The top of the heating assembly is attached or connected to the bottom end of the main body portion. In some embodiments, the main body portion includes an at least partially open bottom end such that a portion of the heating assembly, such as a heated panel or coil(s), come into direct physical contact with the liquid or other contents of the container. This serves to facilitate an efficient and effective heating system, allowing the liquid contents to be heated quickly and in some cases up to a boiling temperature.

One or more modules, such as power source modules, can be connected to the bottom end of the heating assembly, for example, via a cooperative twist and lock connection assembly or other easily removable attachment. In some embodiments, the power source module includes a power input plug for charging optional battery, a 12-volt DC or a 110 volt AC input for providing power to the heating element. As provided above, additional modules may include a storage module with an at least partially open interior allowing for the placement of small items for storage, including, but not limited to tea bags, food items, matches, or other camping, hiking or personal items. Yet another embodiment may include a module or attachment with blending and/or coffee grinding capabilities. In this regard, the attachment or module may include a rotating blade that is capable of grinding, blending or chopping items within the container, such as coffee beans, as an example.

These and other objects, features and advantages of the present invention will become more apparent when the drawings as well as the detailed description are taken into consideration.

BRIEF DESCRIPTION OF THE DRAWINGS

Like reference numerals refer to like parts throughout the several views of the drawings provided herein.

DETAILED DESCRIPTION OF THE INVENTION

Figure 1A:
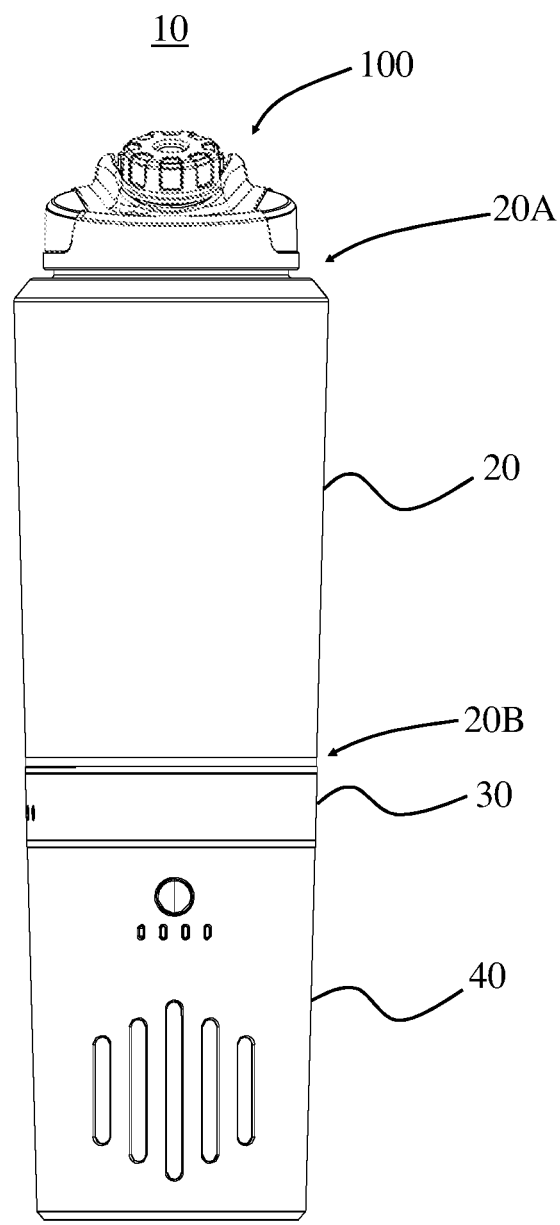
FIG. 1A is a front elevation view of the container as described in accordance with at least one embodiment of the present invention.
Figure 1B:
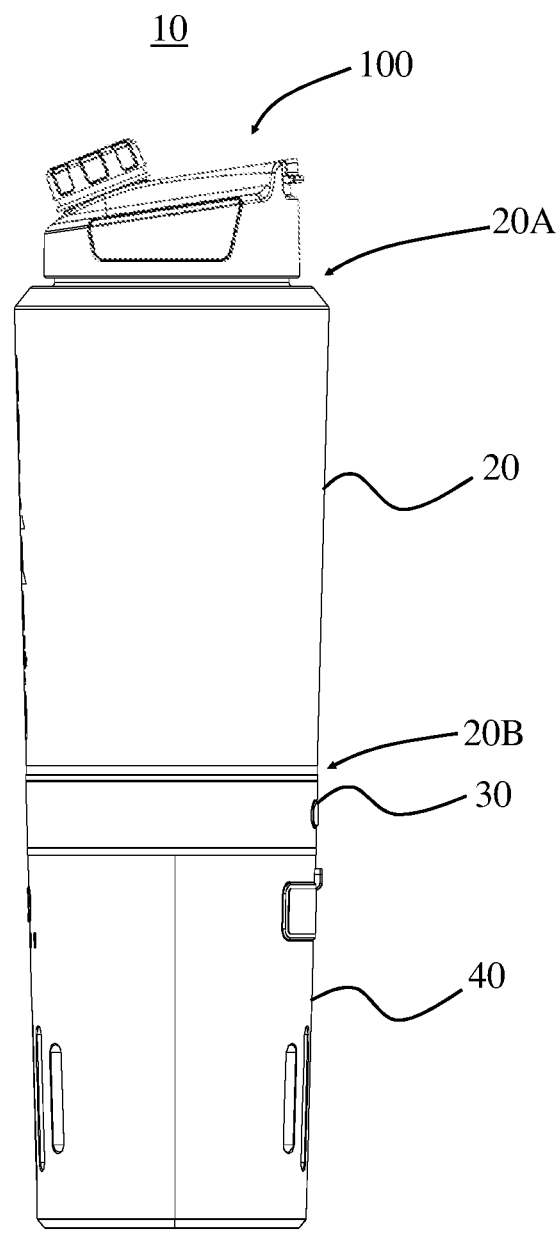
FIG. 1B is a right side elevation view of the container illustrated in FIG. 1A.

As shown in the accompanying drawings, and with particular reference to FIGS. 1A and 1B, the present invention is directed to a beverage container, generally referenced as 10. In particular, as described herein, the beverage container 10 of at least one embodiment is structured and configured to effectively and efficiently control the temperature of a beverage, liquid, fluid or other contents therein. For instance, the beverage container 10 of at least one embodiment includes a heating assembly 30 that is adapted to heat the contents of the container 10 to a predetermined or selected temperature range, and in some cases, at or above a boiling point (e.g., at least 212 degrees Fahrenheit). In some embodiments, the beverage container 10 and/or the heating assembly 30 thereof includes a plurality (e.g., three (3)) heating modes which, when selected, will function to maintain the temperature of the beverage or contents of the container 10 at corresponding predefined or preset temperatures.

Accordingly, still referring to FIGS. 1A and 1B, the container 10 of at least one embodiment includes a main body portion, referenced as 20, and a heating assembly, referenced as 30. As shown, a cap 100 can be secured or connected to a top portion or top end 20A of the main body portion 20, with the heating assembly 30 connected or attached to the bottom end 20B. In this manner, the main body portion 20 is adapted to retain an amount of fluid or other contents therein, while the cap 100 can be used to selectively control the dispensing of the fluid therefrom. The heating assembly 30 is structured and configured to provide controlled heat to the contents of the container 10 in order to control the temperature thereof, such as, for example, by heating the fluid or other contents to a selected temperature or temperature range. In some instances, the heating assembly 30 is powerful enough and/or specifically adapted to heat the fluid or other contents of the container 10 to a temperature at or above a boiling point. This allows a user to selectively boil the contents of the container 10 for an amount of time, if desired.

As also shown in FIGS. 1A and 1B, one or more additional modules, generally referenced as 40, can be secured or selectively removably connected to container 10, such as, to the bottom of the heating assembly 30, for example, via a cooperatively constructed connection assembly, including, but in no way limited a twist and lock type of connection assembly. The one or more modules 40, as shown in FIGS. 1A and 1B, can include a battery module, which includes one or more batteries (e.g. rechargeable lithium ion batteries, replaceable batteries, etc.) that function to provide power or electricity to the heating assembly 30. Other embodiments described and illustrated herein, may include modules 50, 60 with a power or electrical cable for connection to an external power source, such as an AC or DC power source. In this regard, the beverage container 10 may be connected to an external power source (e.g., electrical outlet in a home, office, or vehicle) in order to provide necessary power or electrical connections to the heating assembly 30. In this manner, the additional, auxiliary or attachment module(s) 40 may be electrically interconnected to the heating assembly 30 in order to implement the present invention in the intended manner.

Other embodiments may also include storage module (not illustrated) which can provide storage space, for example, within an at least partially enclosed pocket or other like compartment. In this manner, a user may store keys, money, a wallet, phone, or other items as desired.

Moreover, the main body portion 20 of the container 10 is shown in FIGS. 2A, 2B, 2C and 2D. For instance, as shown in the cut-away view of FIG. 2C, the body 20 of at least one embodiment includes a double wall construction comprising an inner wall 21A and an outer wall 21B. The inner wall 21A and outer wall 21B are spaced apart from one another to define an area or gap there between, at least along a portion of the body 20. In at least one embodiment, the inner wall 21A and outer wall 21B are sealed to one another proximate the top end 20A and bottom end 20B of the body 20 in order to seal the area or gap there between. In some embodiments, the area between the inner wall 21A and outer wall 21B is vacuum sealed and/or includes an insulating material in order to reduce or restrict the dissipation of heat from the fluid or contents within the container 20 and through the body 20 or wall(s) 21A, 21B thereof.

In at least one embodiment, both the inner wall 21A and the outer wall 21B are constructed of a metallic or Stainless Steel material, and in other embodiments or implementations, the inner wall 21A may be constructed of a metal or metallic material, whereas the outer wall 21B may be constructed of a plastic material. However, it should be noted that other materials for the inner and outer walls, as well as other portions and components of the container 10 are contemplated within the full spirit and scope of the present invention.

Furthermore, the body 20 of at least one embodiment includes an at least partially open top 22A through which the fluid (or other contents of the container) can be filled or dispensed. A lid 100 can be secured or removably connected to the open top 22A of the body 20, as illustrated, for example, and configured for allowing consumption of the contents directly from the container 10.

Figure 2A:
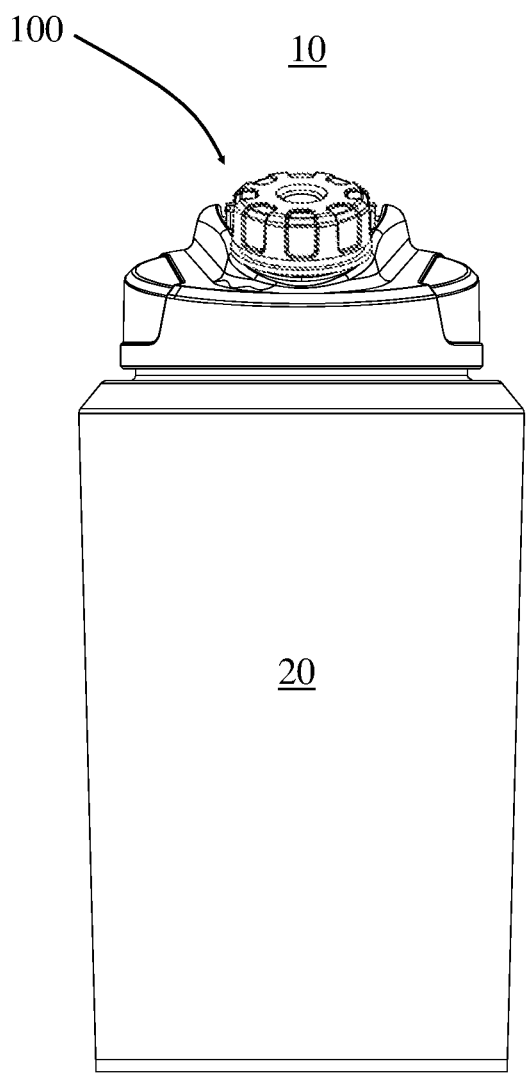
FIG. 2A is a front elevation view of the main body portion and cap as disclosed in accordance with at least one embodiment of the present invention.
Figure 2B:
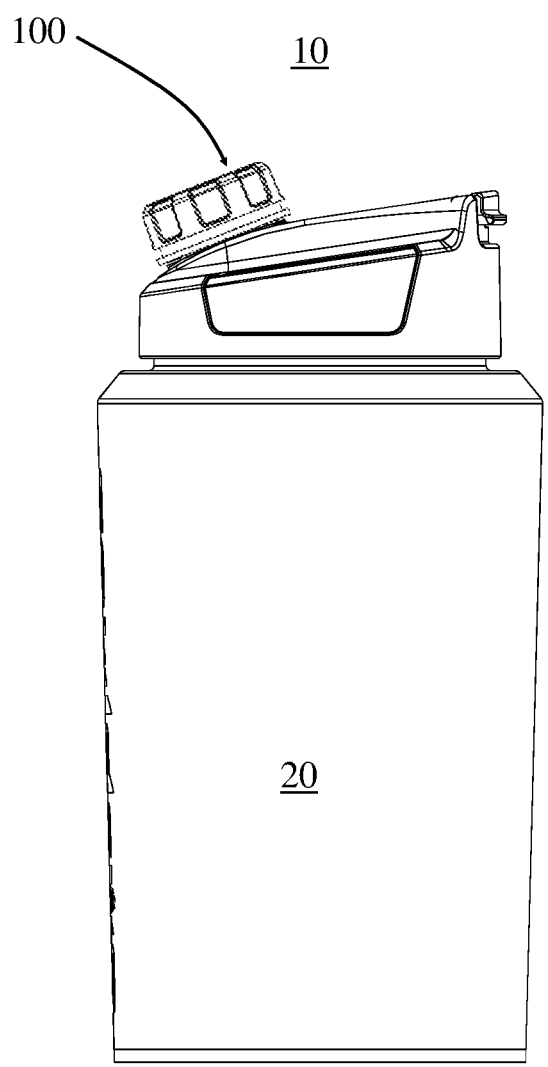
FIG. 2B is a right side elevation view of the main body portion and cap illustrated in FIG. 2A.
Figure 2C:
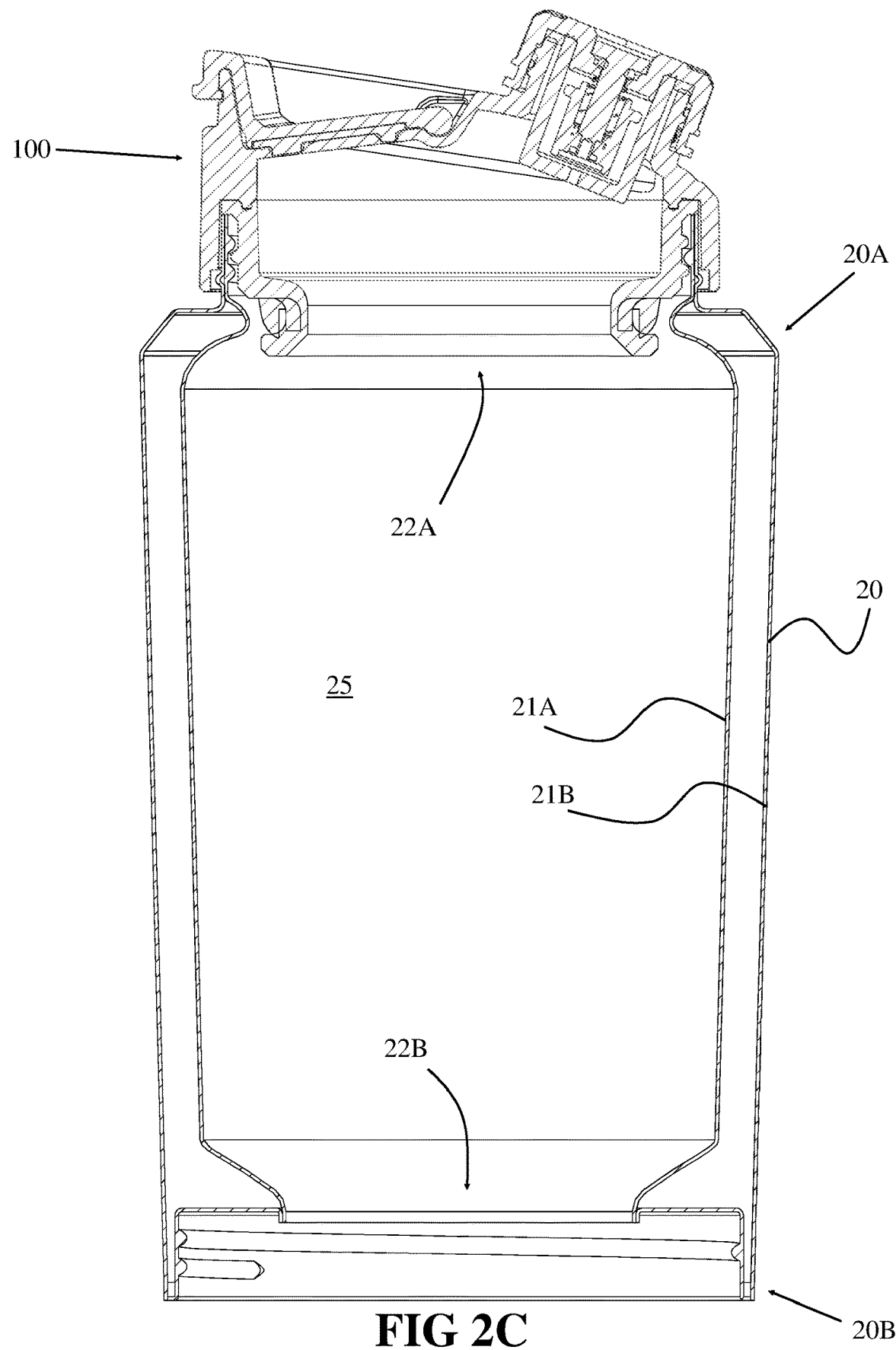
FIG. 2C is a right side elevation cut-away view of the main body portion and cap illustrated in FIGS. 2A and 2B.
Figure 2D:
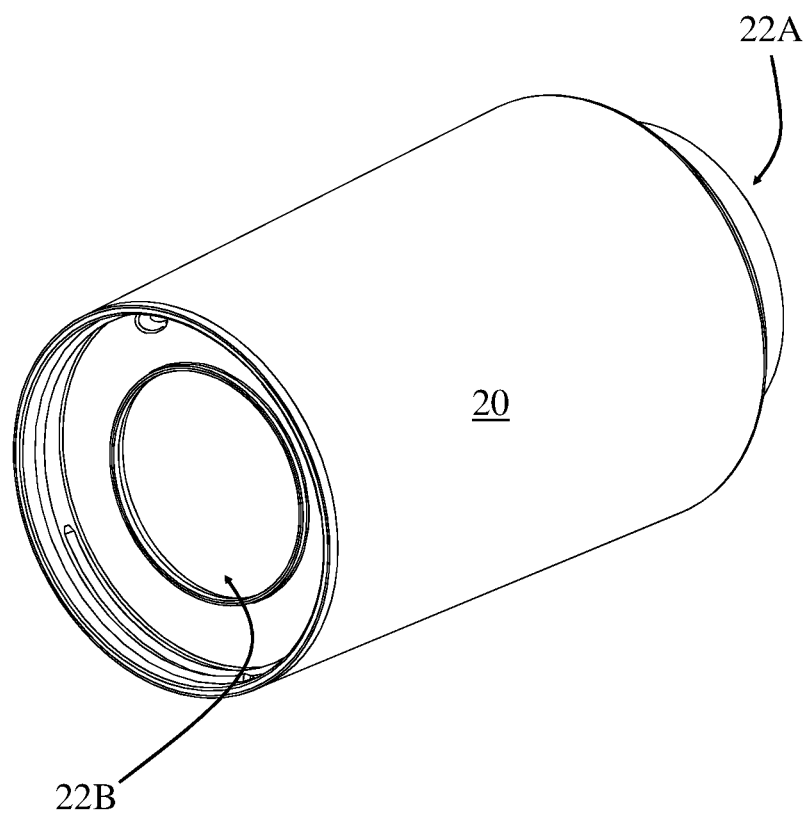
FIG. 2D is a bottom perspective view of the main body portion as disclosed in accordance with at least one embodiment of the present invention.

Additionally, as shown in FIGS. 2C and 2D, in at least one embodiment, the body 20 includes an at least partially open bottom 22B. As described herein, the heating assembly 30 of at least one embodiment is attached (e.g., either removably or fixedly) to the body 20 of the container 10. In this manner, the heating assembly 30, and in particular, the heating element thereof, may be directly exposed to the interior portion 25 of the container 10 (e.g., where the fluid or other contents are contained), and therefore, the heating assembly 30 or heating element thereof may be disposed in direct contact with the fluid or other contents of the container 10, for instance, through the at least partially open bottom end 22B. The direct contact between the contents of the container 10, such as water, fluid, etc., further facilitates the container 10 to quickly, effectively and efficiently increase the temperature of the fluid or other contents to a desired temperate or temperature range. The at least partially open bottom 22B and/or direct and physical contact between the contents of the container 10 and the heating assembly 30 or heating element 35 thereof also facilitates the container 10 in heating the fluid or other contents to or above a boiling point temperature, which, in the case of water is 212 degrees Fahrenheit.

As an example, at least a portion of the heating element 35, such as at least a portion of the heating panel(s), etc., is exposed and in direct physical contact with the contents of the container 10, such as the water or other fluid, liquid, etc. This facilitates a fast and efficient heating system that can heat the contents to high temperate, up to and including a boiling point, such as 212° F.

Moreover, with reference now to FIGS. 3A through 3F, a heating assembly 30 of at least one embodiment is illustrated. In particular, the heating assembly 30 includes an at least partially exposed heating element 35 that is adapted to increase in temperature upon application of electricity or power, for example, from a power source, including a battery pack or electrical cable. As shown, the heating element 35 is exposed on the top of the heating assembly 30, such that, when the heating assembly 30 is attached or secured to the main body portion 20 of the container 10, the heating element 30 is aligned with or otherwise disposed at least partially within the open bottom 22B. In this manner, any contents, including water, fluid, beverage, soup, etc., disposed within the body 20 of the container 10, will be in direct contact with the heating element 35.

Figure 4A:
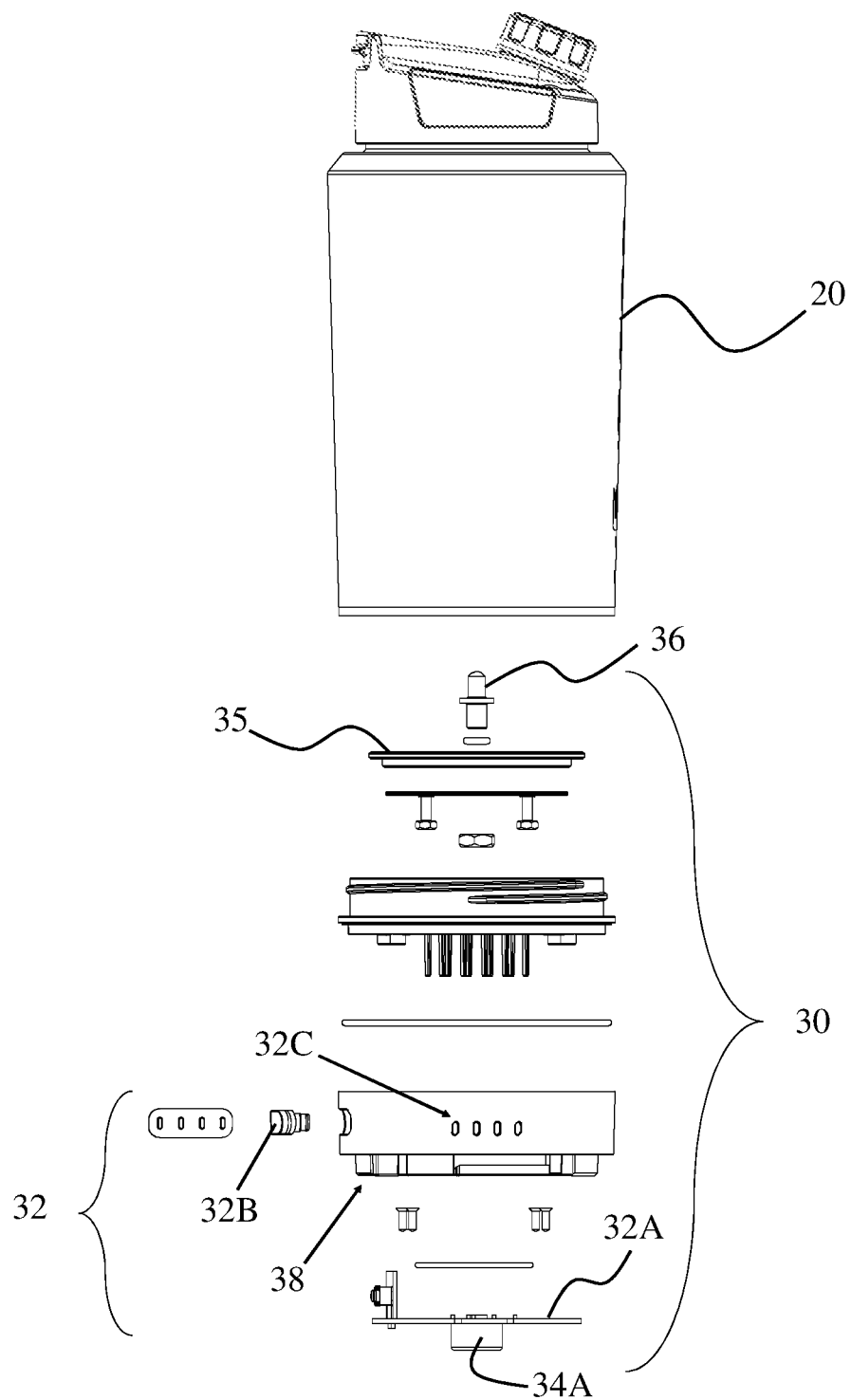
FIG. 4A is an exploded view of the heating assembly and main body portion as disclosed in accordance with at least one embodiment of the present invention.

Furthermore, with reference to FIG. 4A, for example, the heating assembly 30 of at least one embodiment may also include a control assembly, generally referenced as 32, structured to control the heating and/or cooling of the heating elements 35, for example, by supplying or eliminating power or electricity thereto. For instance, the control assembly 32 can include one or more circuit boards, generally referenced as 32A, and/or one or more control buttons or switches 32B structured to select a temperature mode, temperature setting, and/or power the heating assembly on or off, as an example. Some embodiments can include one or more status LEDs or lights, as generally referenced at 32

C, in order to provide a visual representation of the temperature, setting, mode, etc. of the heating assembly 30.

As an example, in at least one embodiment, the heating assembly 30, and in particular the control assembly 32 thereof, may include a plurality of heating modes which can be selected by the user, for example, by selecting one or more of the control buttons or switches 32B, for example. In one implementation, the heating assembly 30 includes two or more, for example, three, heating or 'maintain' modes, each of which represent a different preset or predefined temperature or temperature range. For example, in at least one embodiment, the different temperature ranges or modes may include: (a) 124° F.-134° F., (b) 135° F.-145° F., (c) 160° F.-170° F., and (d) 194° F.-204° F. In some embodiments, the different temperatures may include, for example: (a) 104° F., (b) 140° F., (c) 176° F., and (d) boil or 212° F. For instance, a user may select one of the temperatures or temperature ranges by pressing one or more of the control buttons 32B on the heating assembly 30, e.g., either a short tap or a long press. In operation, when the temperature of the contents of the container 10 fall below the selected preset temperature range, the heating element 35 will be activated until the temperature of the contents is raised to a predetermined temperature, for example, the top end of the temperature range. This cycle will continue so long as the heating assembly 30 remains activated and in a selected temperature mode.

As provided above, in at least one embodiment, the heating assembly 30 can include a 'boil' mode in which the temperature of the contents is raised to a boiling temperature (e.g. 212° F.). This is accomplished at least in part because of the direct contact between the heating element 35 and the contents of the container 10, as well as the amount of power and electricity that is supplied thereto.

Furthermore, and with reference still to FIGS. 3A through 3D and 3F, at least one embodiment of the present invention further includes a temperature sensor 36 connected, attached or exposed on the top end of the heating assembly 30. As shown, the temperature sensor 36 may be in the form of a node or probe that extends at least partially from the top of the heating assembly 30. In some embodiments, the heating element(s) 35 may be disposed at least partially around an inner circumferential portion of the heating assembly 30 with the temperature sensor 36 extending upward from the center thereof, although other configurations are certainly contemplated within the full spirit and scope of the present invention.

Furthermore, it should be noted that the temperature sensor 36 or probe may extend at least partially into the main body of the container 10 in a manner such that it comes into direct physical contact with the contents of the container 10, such as a heated liquid. This allows the temperature sensor 36 or probe to obtain accurate and/or precise temperature readings of the contents. For instance, as described herein, when the temperature of the contents is reduced or falls below a certain selected temperature range, the heating element 30 may be activated to raise the temperature. When the temperature sensor 36 or probe detects the temperature of the contents as being within the selected range or approximately at the selected temperate, then the heating elements 30 of some embodiments may turn off or be reduced in temperature. This cycle will continue at least while a temperature or temperature range is selected or activated on the container 10 or heating assembly 30.

Figure 4B:
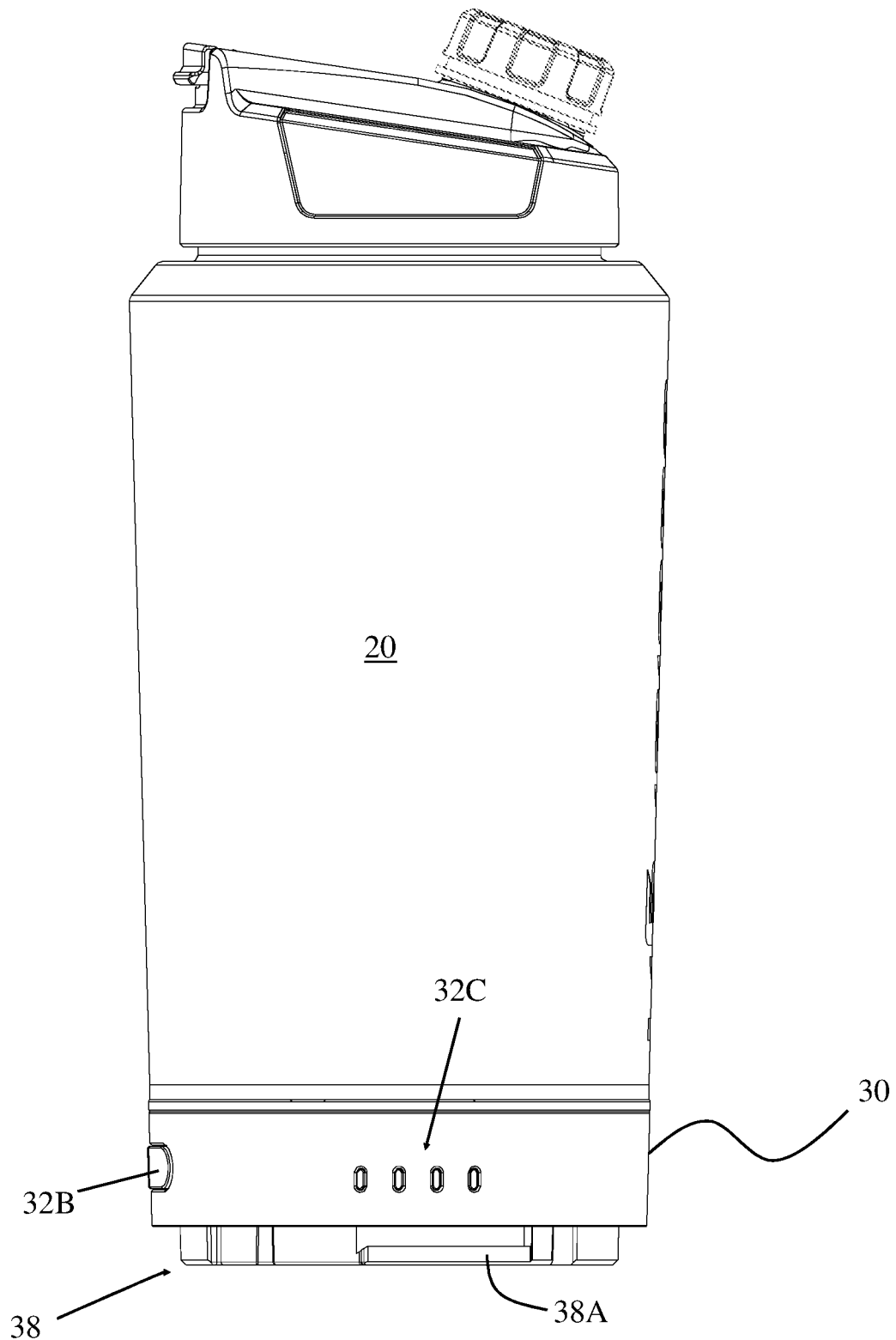
FIG. 4B is a left side elevation view of the main body portion, heating assembly and cap as disclosed in accordance with at least one embodiment of the present invention.
Figure 4C:
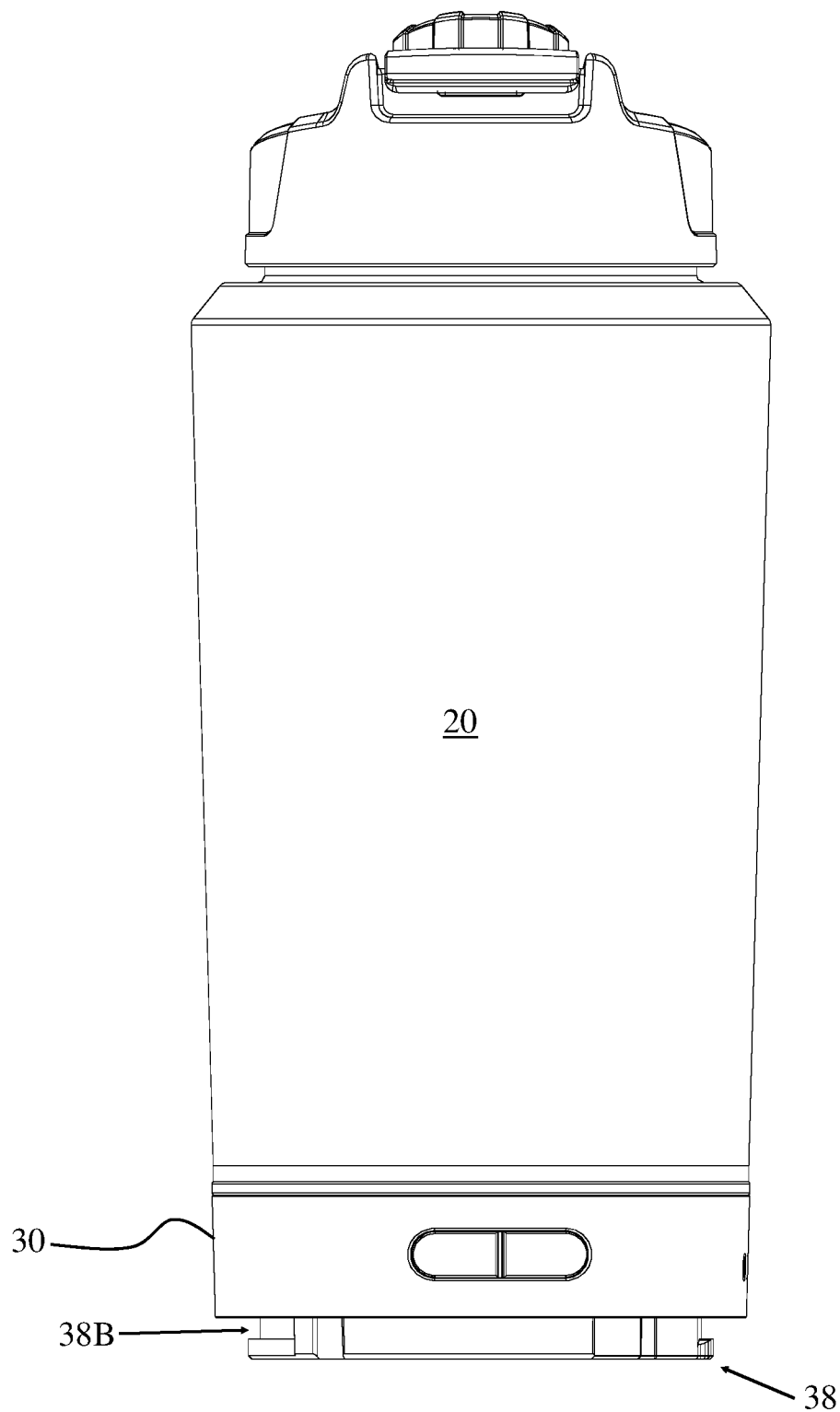
FIG. 4C is a rear elevation view of the embodiment illustrated in FIG. 4B.
Figure 4D:
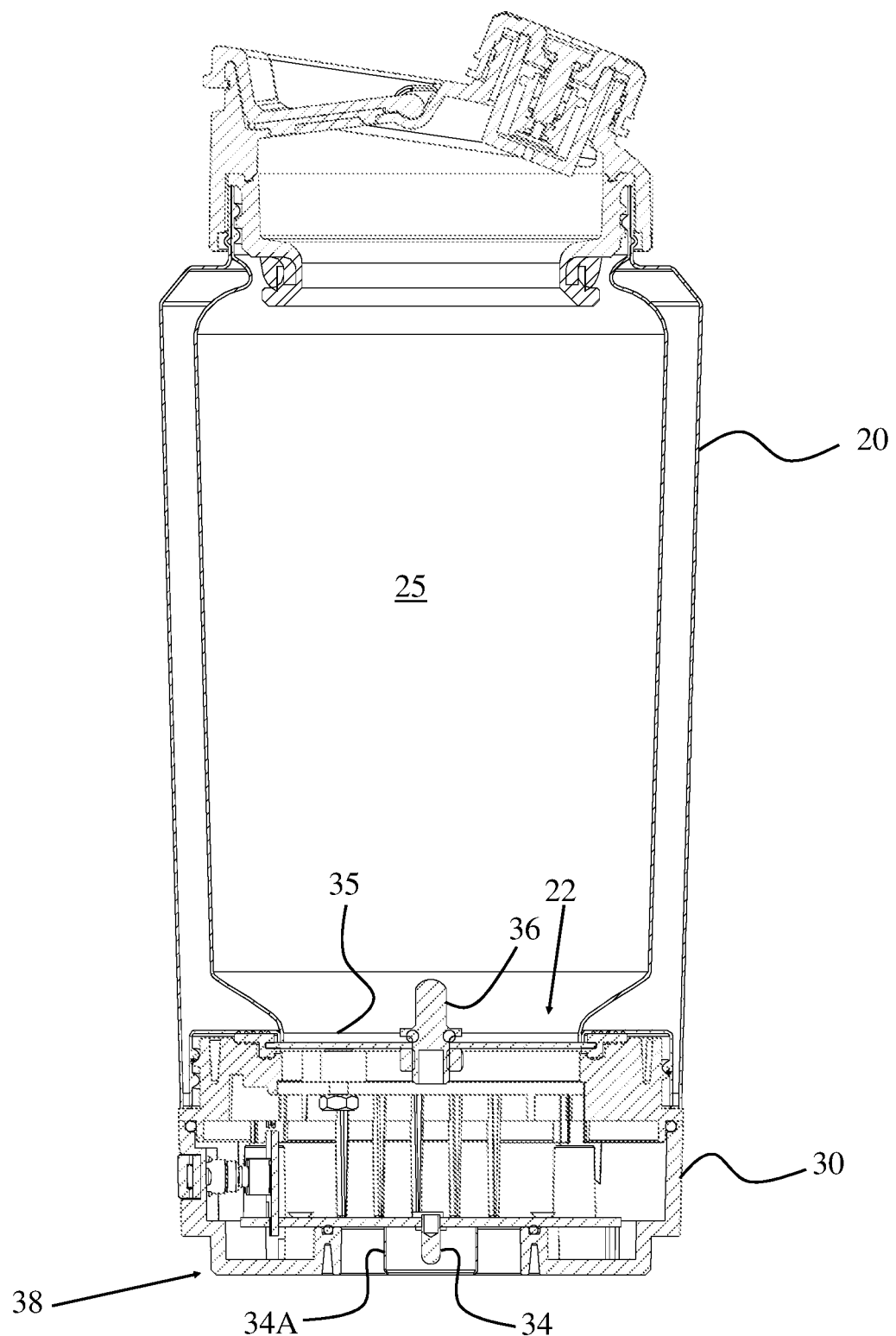
FIG. 4D is a cut away view of the embodiment illustrated in FIGS. 4B and 4C.

FIGS. 4B through 4D illustrate the heating assembly secured to the bottom end of the main body portion 20 of the container 10. In some embodiments, the heating assembly 30 may be fixedly attached or connected to the main body portion 20 in that it may not intended to be easily or readily removed. In other embodiments, the heating assembly 30 can be removably attached to the main body portion 20, for example, via cooperative threaded components or other attachment assemblies that provide a liquid tight seal. In such an embodiment, removing the heating assembly 30 can expose the open bottom 22B of the main body portion 20, which can provide access to the interior of the container 10 thereby. This can help with the cleaning of the interior portion of the container 10.

Figure 3A:
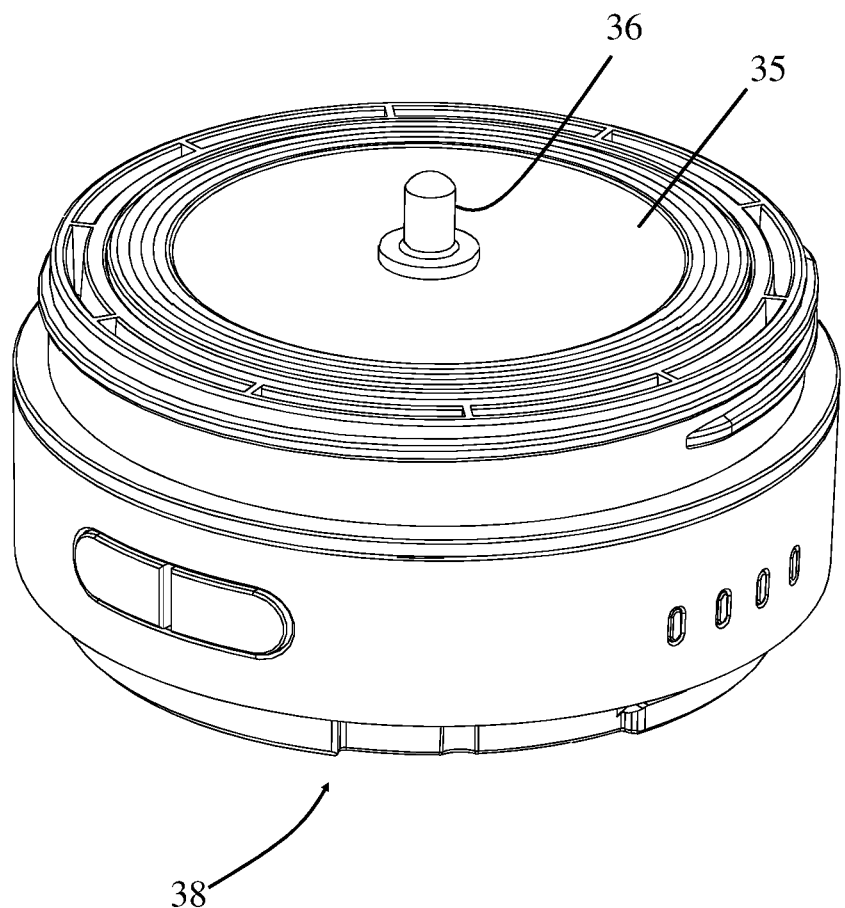
FIG. 3A is a perspective view of the heating assembly as disclosed in accordance with at least one embodiment of the present invention.
Figure 3B:
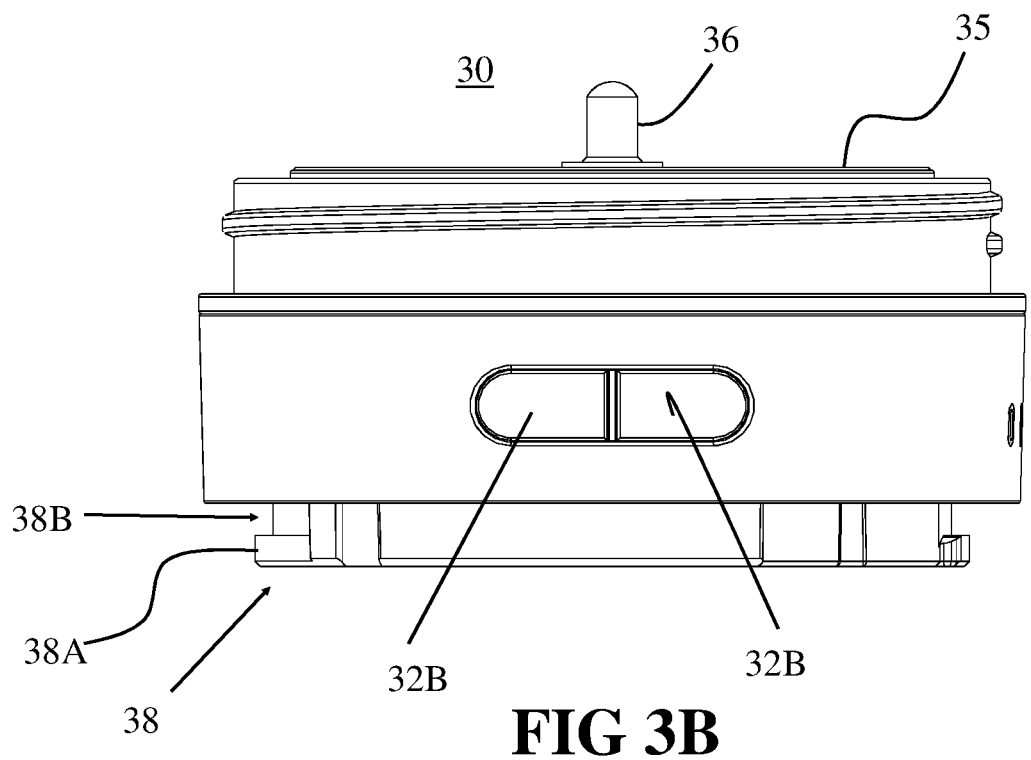
FIG. 3B is a front elevation view of the heating assembly as disclosed in accordance with at least one embodiment of the present invention.
Figure 3C:
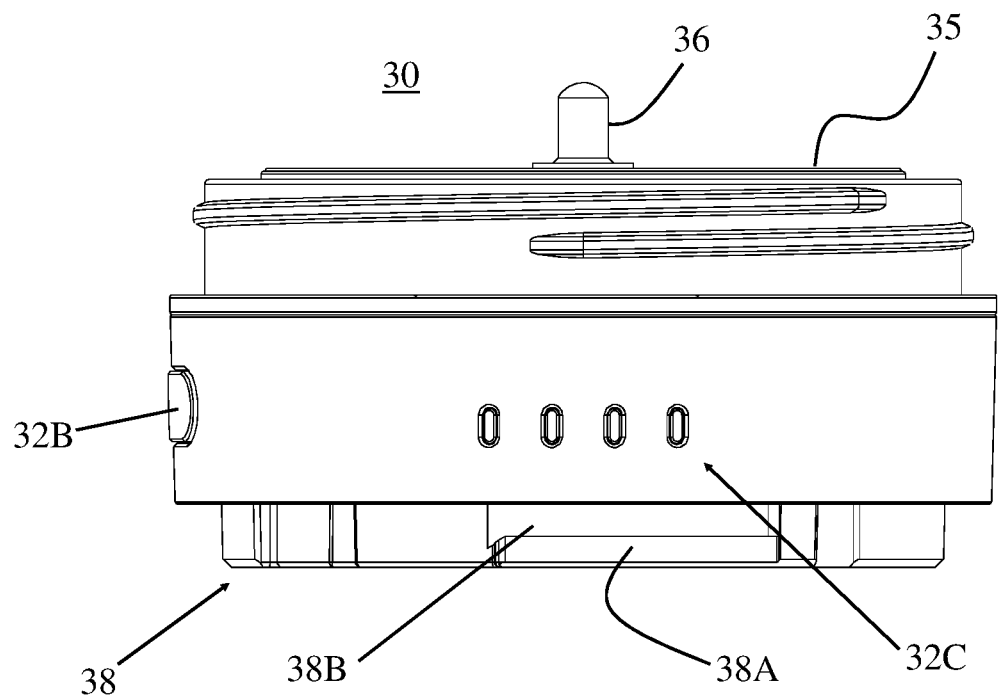
FIG. 3C is a right side elevation view of the heating assembly illustrated in FIG. 3B.
Figure 3D:
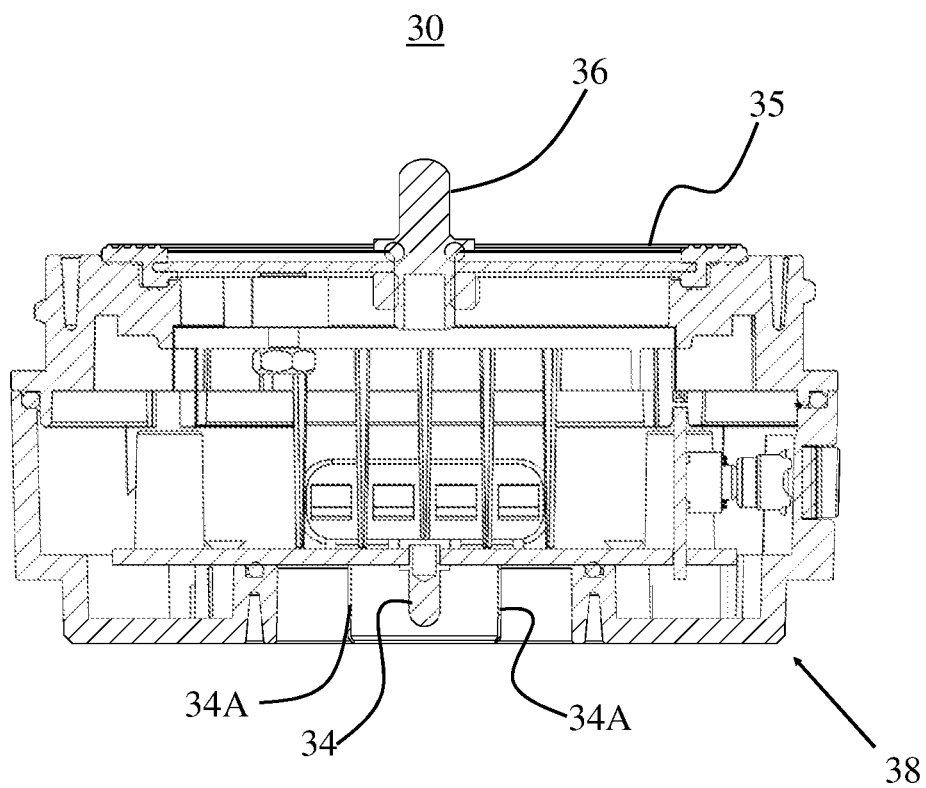
FIG. 3D is a cut away view of the heating assembly illustrated in FIGS. 3B and 3C.
Figure 3E:
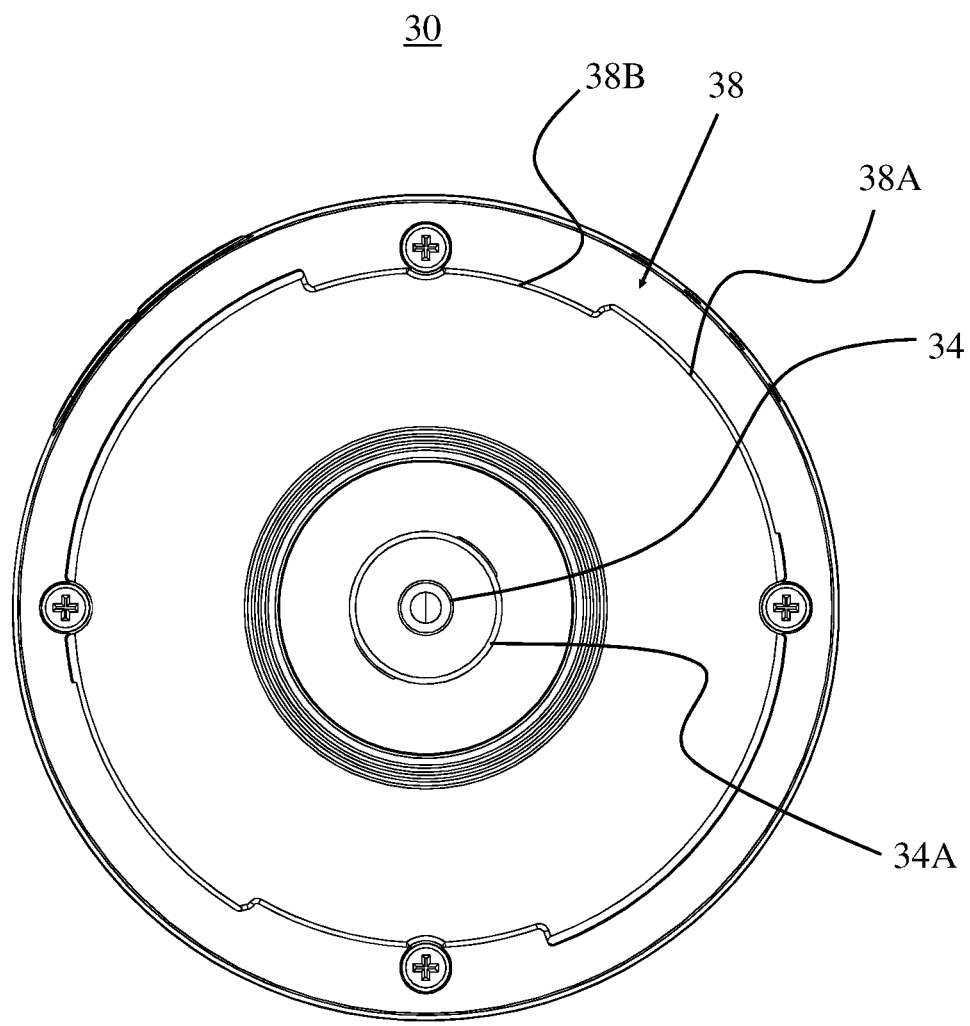
FIG. 3E is a bottom view of the heating assembly illustrated in FIGS. 3B and 3C.
Figure 3F:
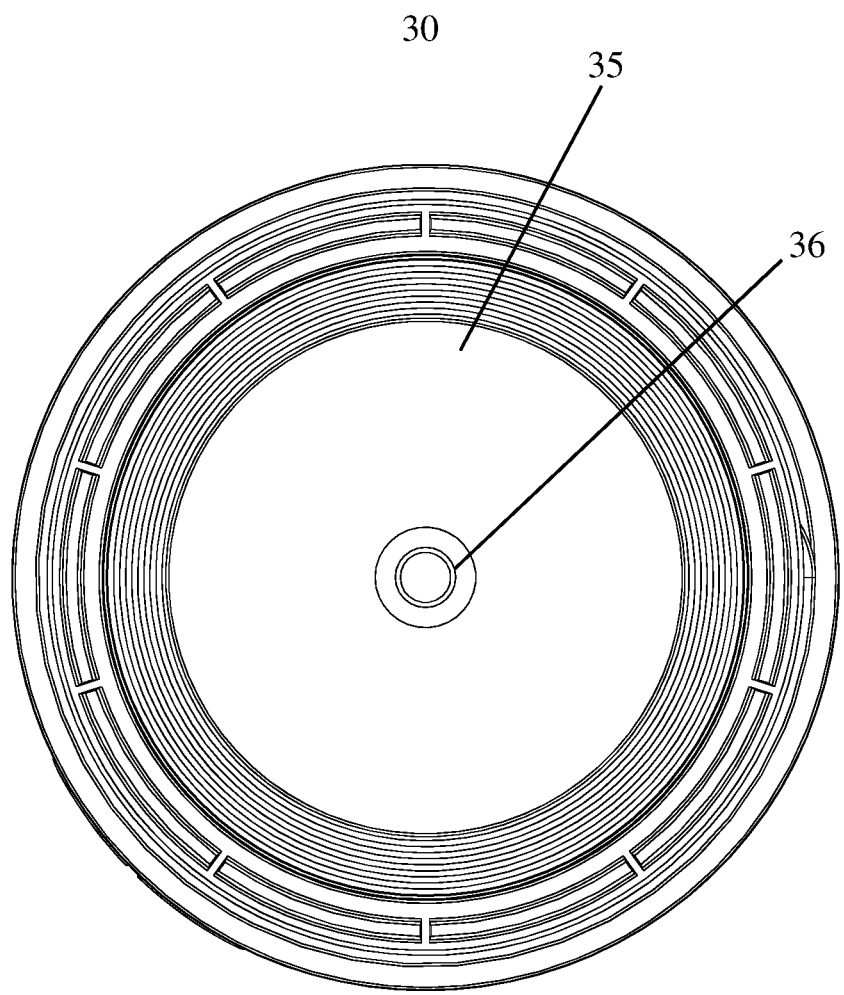
FIG. 3F is a top view of the heating assembly illustrated in FIGS. 3B and 3C.

Furthermore, with reference to FIGS. 3E, 4A, and 4D, the heating assembly 30 includes one or more electrical connections, such as or prongs 34 and ring 34A, configured to electrically connect with a power source module 40, 50, 60 such as a battery pack module or AC/DC power module, for example. Particularly, the electrical connections 34, 34A of at least one embodiment are structured to electrically connect with a separate power source module 40, 50, 60 as described herein, and are capable of transferring power or electricity from the power source module 40, 50, 60 to the heating assembly 30 or the heating element 35, thereof, for example, as controlled by the control assembly 32.

In the embodiment shown, the electrical connections of the heating assembly 30 may include a prong or probe 34 that extends downward and an outer ring 34A that at least partially or completely encircles or surrounds the prong 34. The prong 34 and ring 34A may both be constructed of a metal or metallic material configured to facilitate an electrical connection. One of the connections, such as prong 34 may be a positive terminal, while the other connection 34A may be a negative terminal, although the polarity of the terminals 34, 34A may be reversed. In any event, as described herein, the prong 34 will be engaged by a corresponding peg, pegs or other electrical connection(s) of a corresponding module 40, 50, 60 and the ring 34A will be engaged by another peg, pegs or other electrical connection(s). This design or configuration allows the additional module, e.g., a power source module 40, 50, 60 to electrically connect to the heating assembly 30, while also allowing the heating assembly 30 and/or module 40, 50 60 to twist or rotate relative to one another without the electrical connections being dislodged or losing contact.

Furthermore, a connection assembly 38 is also included in at least one embodiment of the heating assembly 30 of the present invention. The connection assembly 38 is structured to facilitate selective interconnection between the heating assembly 30 and the power source or additional module 40. As illustrated, the connection assembly 38 of at least one embodiment may include a twist and lock mechanism such that the bottom end of the heating assembly 30 can cooperatively interconnect with the top end of the additional or power source module 40, 50, 60 by engaging the heating assembly 30 and the additional or power source module 40, 50, 60 and twisting the heating assembly 30 (or the connected main body portion 20), for example, a half or quarter revolution. In this manner, the connection assembly 38 of at least one exemplary embodiment may include one or more ledges 38A, grooves 38B, etc. that are structured to cooperatively interconnect with similarly shaped corresponding ledges or grooves on the top end or top portion of the additional or power source module. Accordingly, twisting, locking or otherwise connecting the heating assembly 30 to the additional or power source module 40, 50, 60 allows the main body 20, the heating assembly 30, and the additional or power source module 40, 50, 60 to be raised, lowered and/or otherwise transported as a single connected unit.

Other connection assemblies, including, snaps, hooks, recesses, grooves, etc. can be used in accordance with the various embodiments of the present invention.

It should also be noted that, in at least one embodiment, the main body portion 20 and the heating assembly 30 can be easily disconnected from the additional or power source module(s) 40, 50, 60. In this regard, a user can keep the power source module 40, 50, 60 sitting on a table, in a cup holder, etc. while the main body potion 20 and the heating assembly 30 can be raised and lowered as a unit for drinking purposes. Each time the user sets the main body portion 20 and the heating assembly 30 down, he or she can set it upon the power source module 40, 50, 60 for continued heating and/or operation thereby. Accordingly, in some embodiments, the heating assembly 30 may be electrically connected to the additional or power source module without engaging the connection assemblies or otherwise without locking the heating assembly 30 to the additional or power source module. Other embodiments may require the connections assemblies to be locked or engaged in order to ensure or provide an electrical connection there between.

With reference now to FIGS. 5A through 5F, one embodiment of the additional or attachment module 40, such as a power source module, is illustrated. In this embodiment, the module 40 includes a battery pack in that it incorporates at least one, and in most cases, a plurality of batteries, such as rechargeable batteries. In such a case, the module 40 can be plugged into an external power source, such as an AC or DC power outlet to recharge the batteries.

Figure 5A:
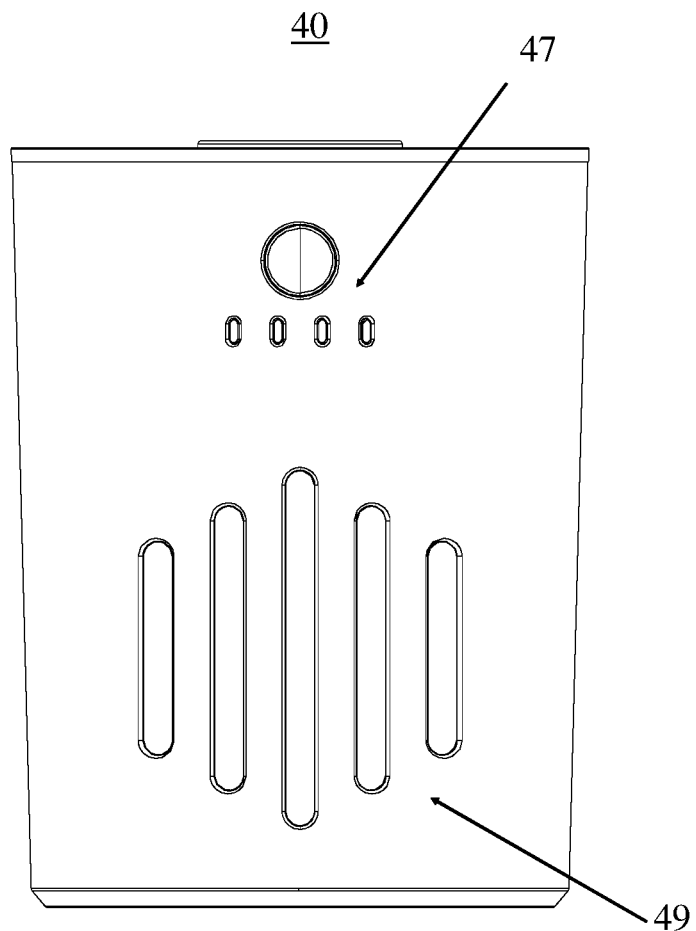
FIG. 5A is a front elevation view of the battery module as disclosed in accordance with at least one embodiment of the present invention.
Figure 5B:
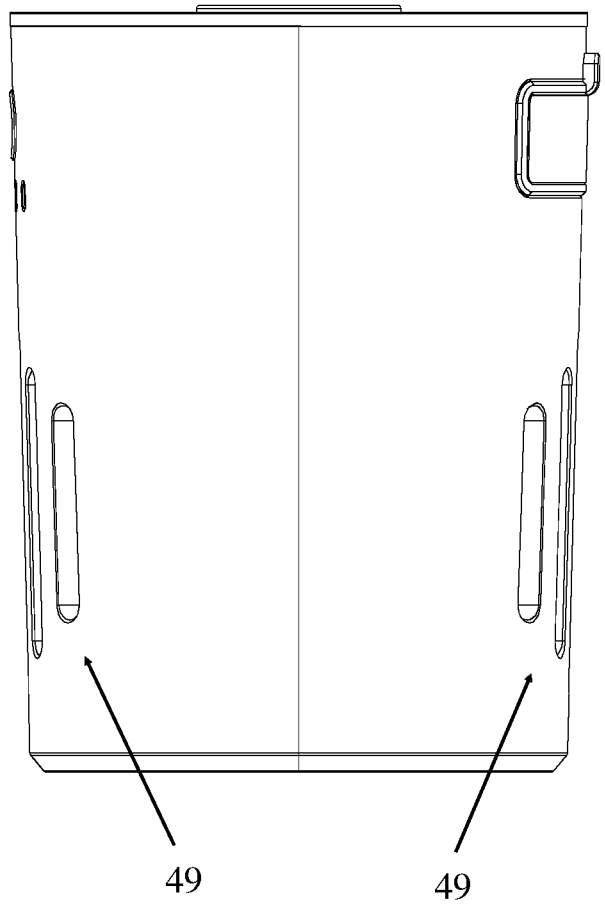
FIG. 5B is a right side elevation view of the battery module as disclosed in accordance with at least one embodiment of the present invention.

In any event, with reference to FIGS. 5A though 5D, the module 40 includes a connection end 48 which is structured to interconnect with the connection assembly 38 of the heating assembly 30. For instance, as shown in FIG. 5D, the connection end 48 of the module 40 may include one or more recesses 48A with one or more peripheral flanges 48B. With the connection assembly 38 of the heating assembly 30 disposed at least partially within the recess 48A, the one or more flanges 48B will engage or connect with the heating assembly 30, for example, upon twisting the connection assembly 38 relative to the module 40. For instance, in some embodiments, the one or more flanges 48 may slide within one or more grooves 38B and/or engage one or protrusions or ledges 38A of the connection assembly 38. As provided above, other connection assemblies can be implemented within the full spirit and scope of the present invention.

Figure 5C:
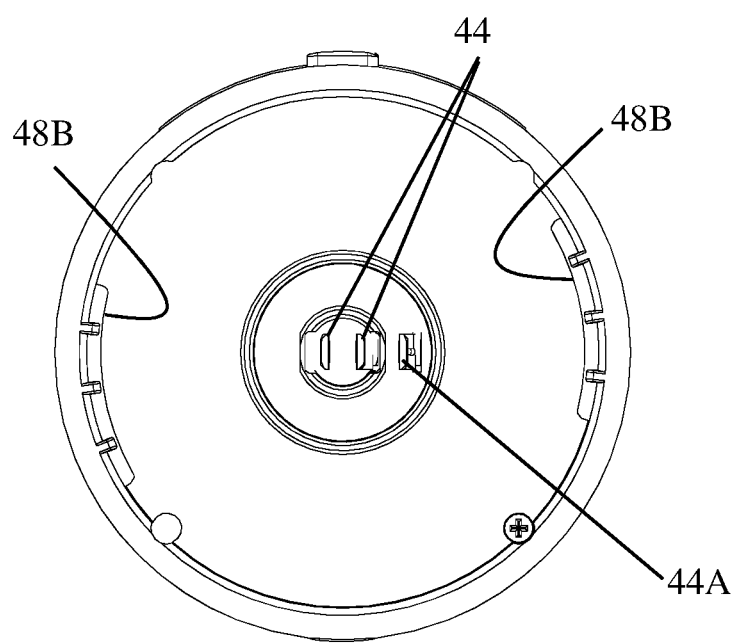
FIG. 5C is a top view of the battery module as disclosed in accordance with at least one embodiment of the present invention.
Figure 5D:
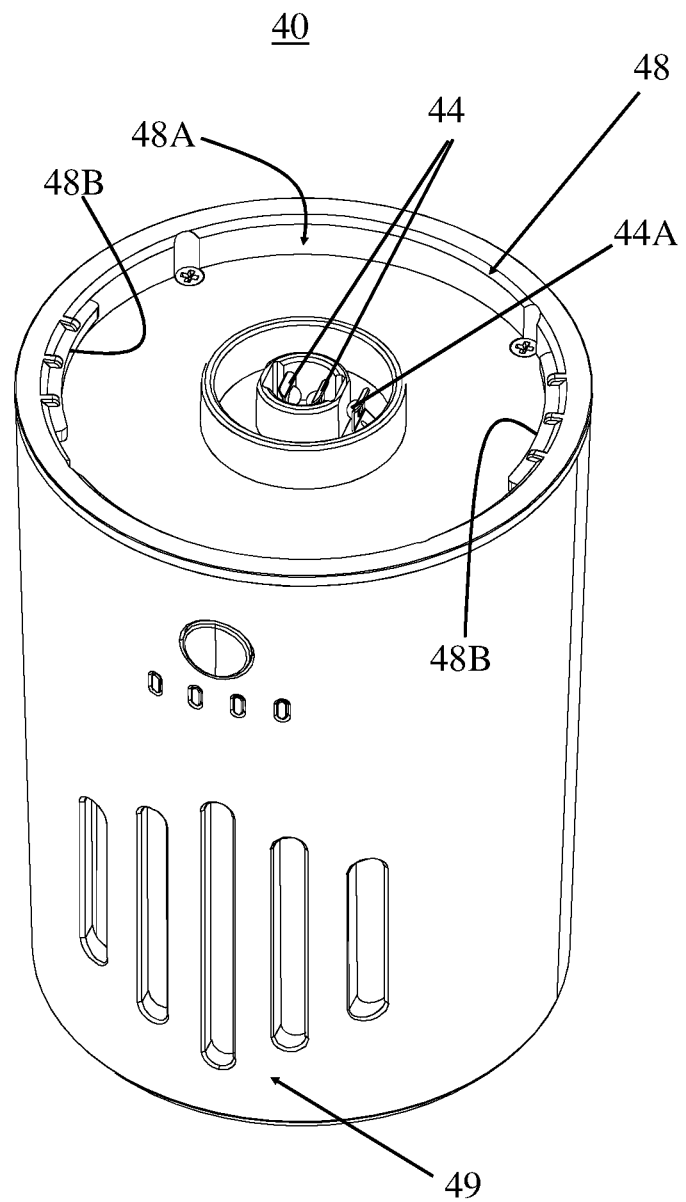
FIG. 5D is a perspective view of the battery module as disclosed in accordance with at least one embodiment of the present invention.

Furthermore, as shown in the top view of FIG. 5C, the module 40 includes at least one electrical connection 44, 44A configured to receive or otherwise electrically connect with the electrical connection 34, 34A of the heating assembly 30. In the embodiment illustrated, the connection 44 of the module 40 includes at least two prongs 44 or two electrical connections within which the electrical connection 34 or prong(s) of the heating assembly 30 can be disposed. An outer peg or electrical connection 44A of at least one embodiment is structured to engage or contact ring 34A. Upon doing so, the electrical connections 34, 34A and 44, 44A of the heating assembly 30 and module 40, respectively, will electrically interconnect with one another thereby allowing the power or electricity from the module 40 to flow or transfer to the heating assembly 30. Also, this design allows the heating assembly 30 and/or module 40 to spin, twist or rotate (for example partially or 360 degrees) relative to one another without the electrical contacts being disconnected. This is accomplished via the ring 34A and the outer contact 44A.

Figure 5E:
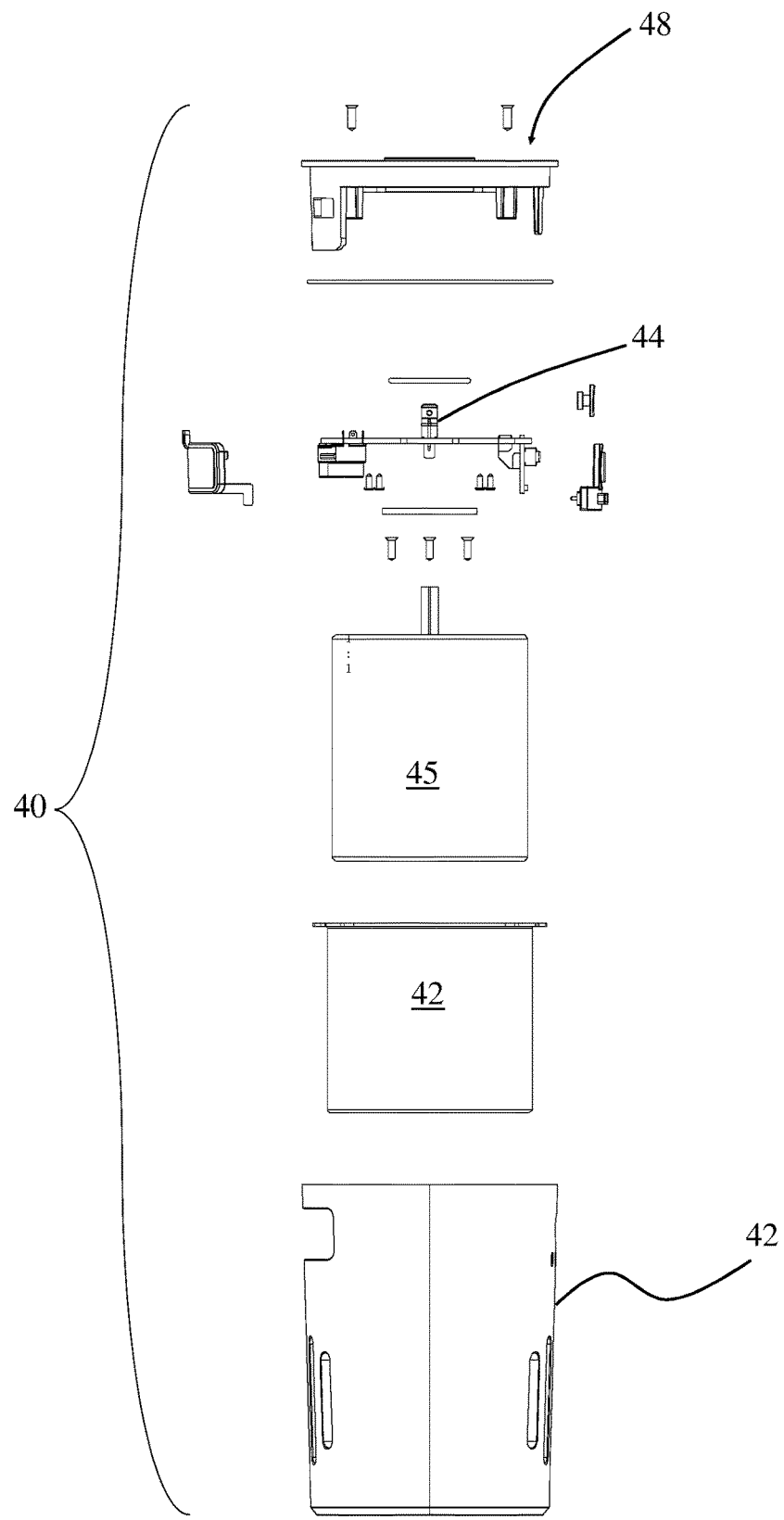
FIG. 5E is an exploded view of the battery module as disclosed in accordance with at least one embodiment of the present invention.
Figure 5F:
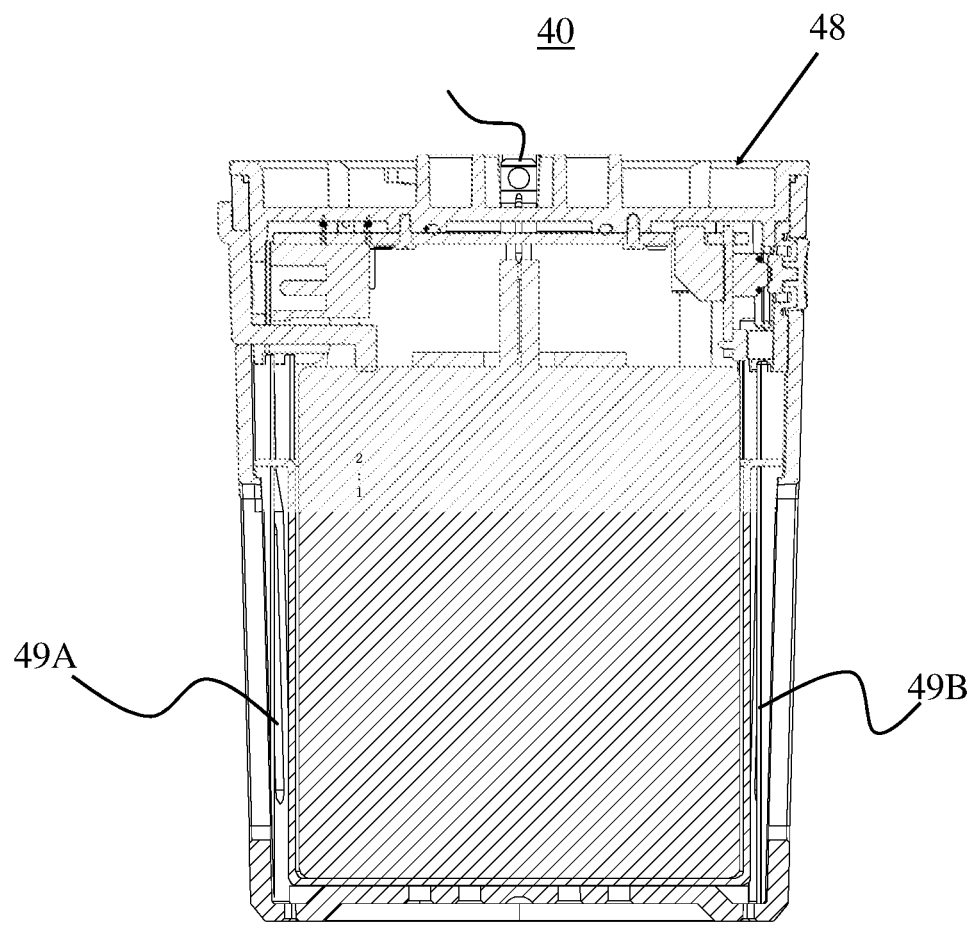
FIG. 5F is a cut away view of the battery module as disclosed in accordance with at least one embodiment of the present invention.

With reference now to the exploded view of FIG. 5E, the module 40 of at least one embodiment includes a plurality of batteries 45, disposed within a housing 42 and electrically connected to connection 44. In at least one embodiment, the module 40 may include at least four (4) batteries, and in some embodiments eight (8) or more batteries. The module 40 and batteries 45 thereof, provide high current capable of providing enough electricity to the heating assembly 30 for the heating assembly 30 to boil water and/or otherwise operate in the intended manner, as described herein. In one exemplary embodiment, the module 40 may include eight (8) lithium rechargeable batteries (e.g., ICR18650 batteries) with approximately 2600 mAh each, although other batteries with different capabilities and specifications are contemplated within the various embodiments of the present invention. Moreover, in one embodiment, four (4) batteries may be connected in series, with at least two (2) connected in parallel. In one exemplary embodiment, the beginning current may be approximately 15 A, with a working current between 11 A and 14 A.

One or more LEDs or status lights 47 may be included and visible external to the module 40 in order to visually reference or determined the current battery level or electrical charge remaining on the battery pack or module 40.

It should also be noted that certain embodiments of the present invention may also include a cooling assembly structured to facilitate the effective dissipation of heat that may be generated by the battery pack or module 40. For instance, the cooling assembly of at least one embodiment may include one or a plurality of ventilation holes, generally referenced as 49, disposed on at least some portions of the housing. The ventilation holes may be arranged on one or more sides and/or bottom surfaces of the housing.

Figure 5G:
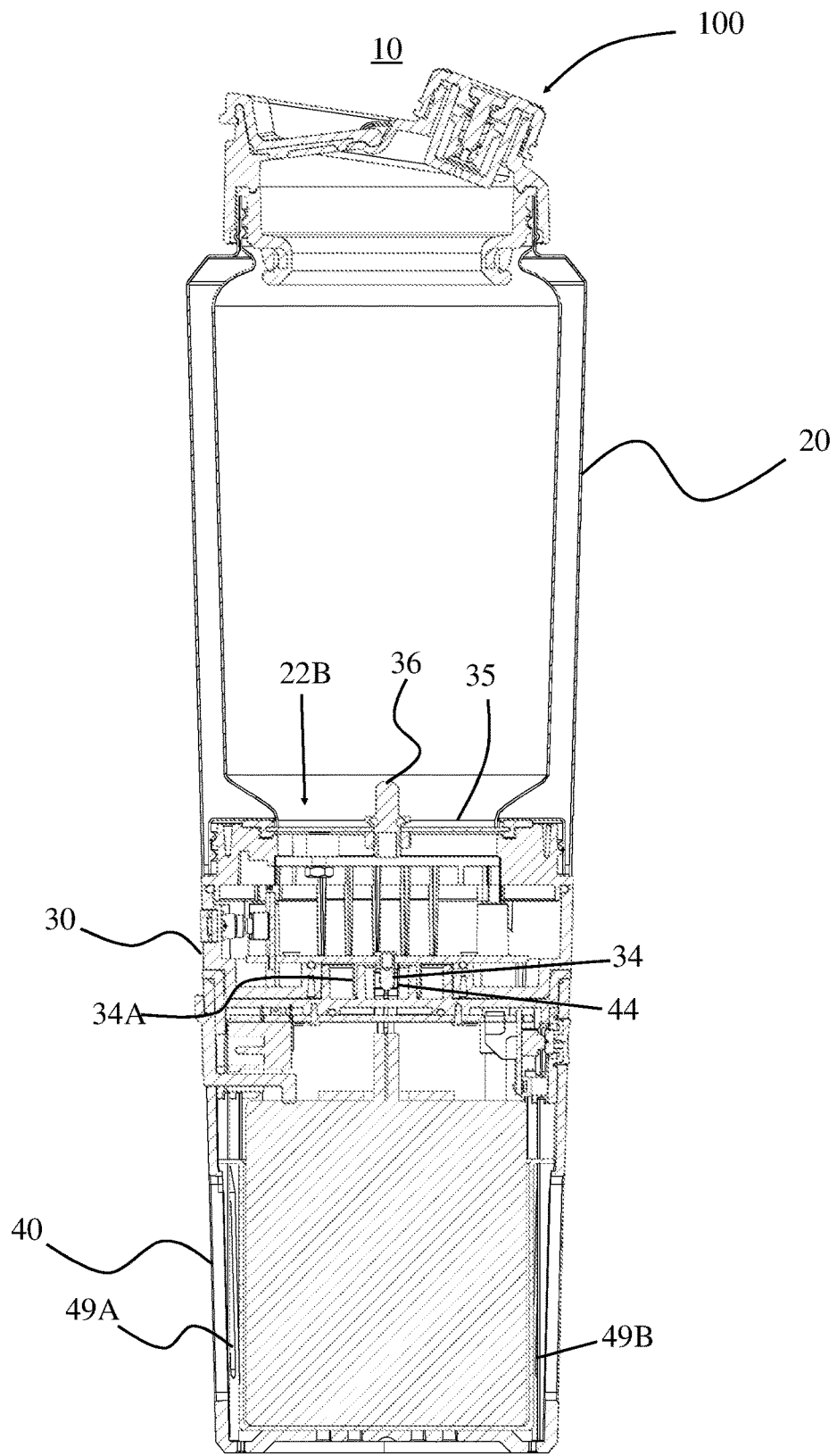
FIG. 5G is a cut away view of the container as disclosed in accordance with at least one embodiment of the present invention, including the main body portion, heating assembly, battery module and cap.

Furthermore, it should be noted that it takes a tremendous amount of energy to boil water, which can create a significant amount of heat, for example, in the battery module 40 or other modules 50, 60, described herein. Accordingly, additional components or features of the cooling assembly, which may be implemented in the battery module 30 or other modules disclosed herein, may also include one or more heat sinks, generally referenced as 49A and 49B, disposed at least partially within or otherwise connected to the module 40, 50 or 60. For instance, with reference to FIGS. 5F and 5G, n some cases, the heat sink(s) 49A, 49B, may be disposed along one or more side surfaces of the module, such as along or proximate one or more ventilation holes 49, in order to facilitate in the dissipation of heat and to prevent potential overheating of the module or otherwise in order to prevent or minimize the module being overly hot to the touch. The heat sink(s) 49A, 49B of certain embodiments may include one more sheets or panels, whether flat, corrugated or otherwise, of metal configured to dissipate the heat. Other embodiments may also include one or more heat sinks disposed along the bottom surface of the module (not shown).

FIGS. 6A through 6F illustrate another embodiment of an additional or power source module 50. In this embodiment, a connection 51 is provided for connecting the module 50 to an external power source, such as an AC electrical outlet, for example, via an electrical or power cable (not shown). The external power source can then provide the power though the corresponding cable to the module 50, which in turn is electrically connected to the heating assembly 30. For instance, the module 50 illustrated in FIGS. 6A through 6F can be selectively connected or disconnected with the heating assembly 30 in the same manner as the module 40 described above and illustrated in FIGS. 5A through 5F.

Figure 6A:
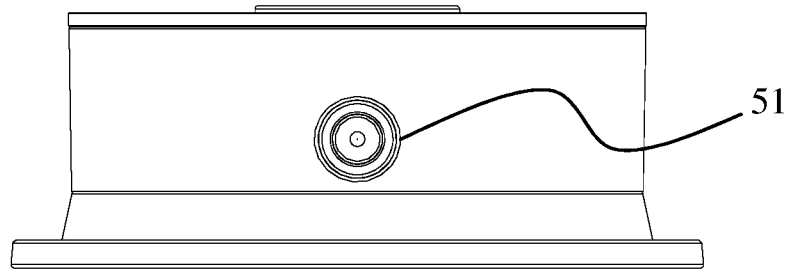
FIG. 6A is an elevation view of an exemplary power source module as disclosed in accordance with at least one embodiment of the present invention.
Figure 6B:
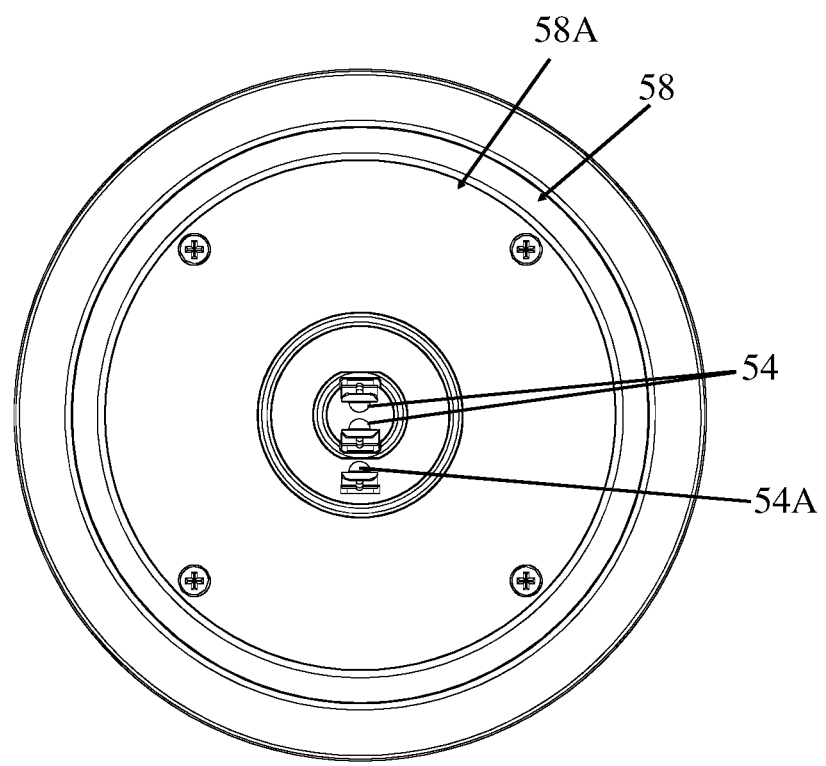
FIG. 6B is a bottom view of the exemplary power source module illustrated in FIG. 6A.
Figure 6C:
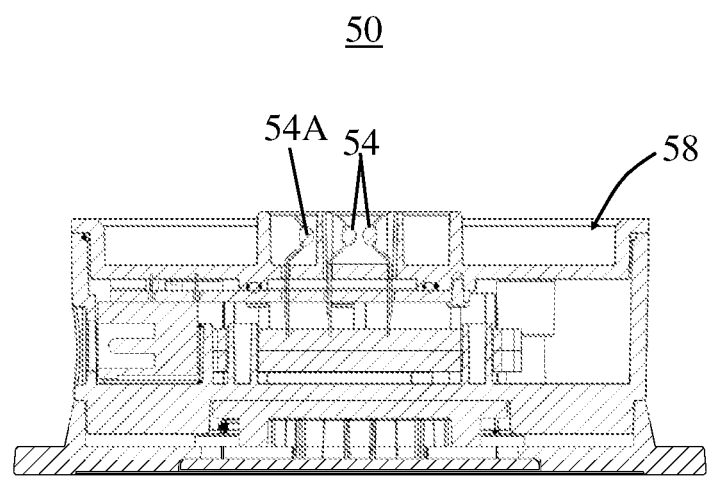
FIG. 6C is a cut away view of the exemplary power source module illustrated in FIG. 6A.
Figure 6D:
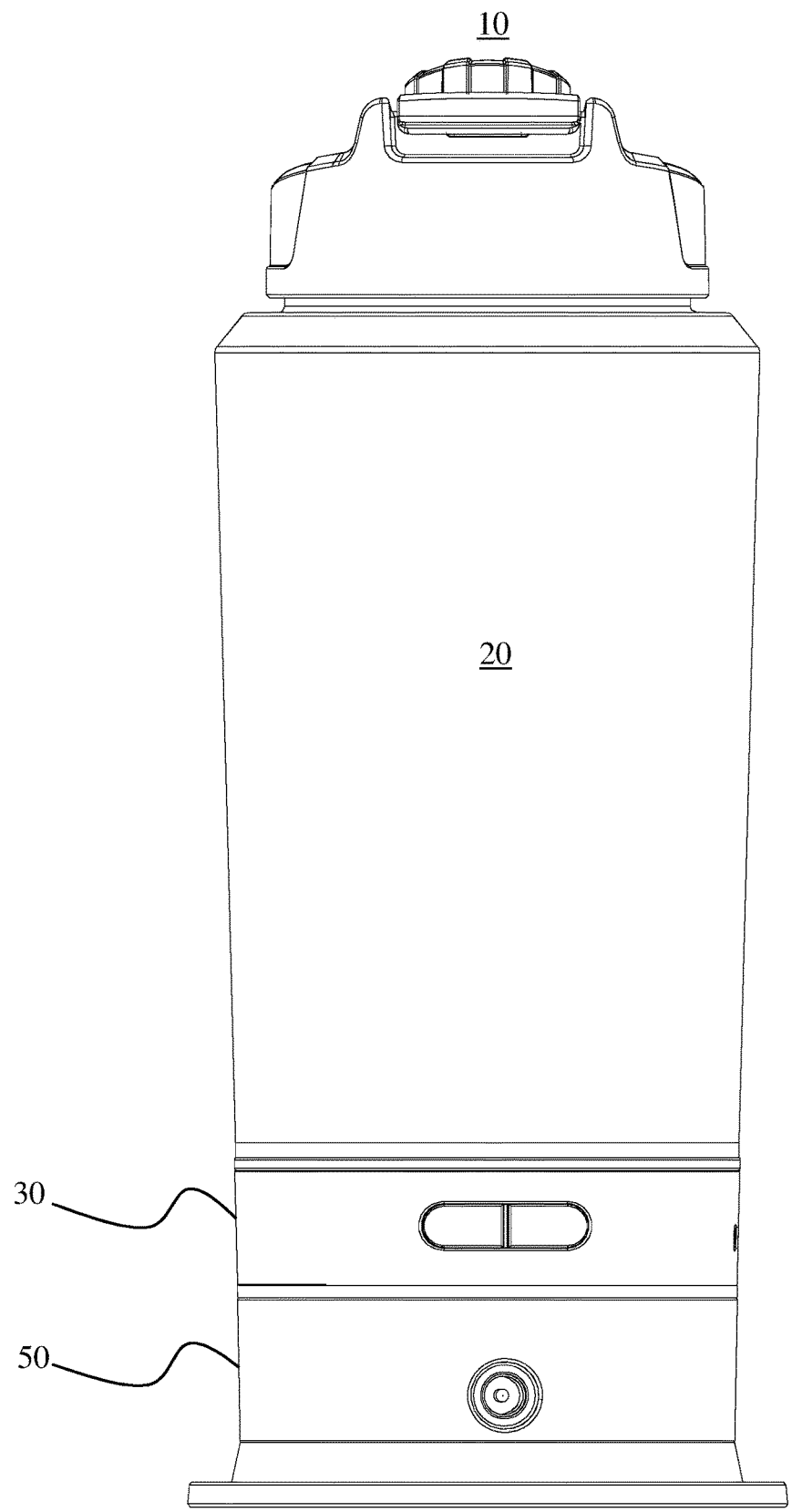
FIG. 6D is a front elevation view of the container as disclosed in accordance with at least one embodiment of the present invention, including the main body portion, heating assembly, exemplary power source module and cap.
Figure 6E:
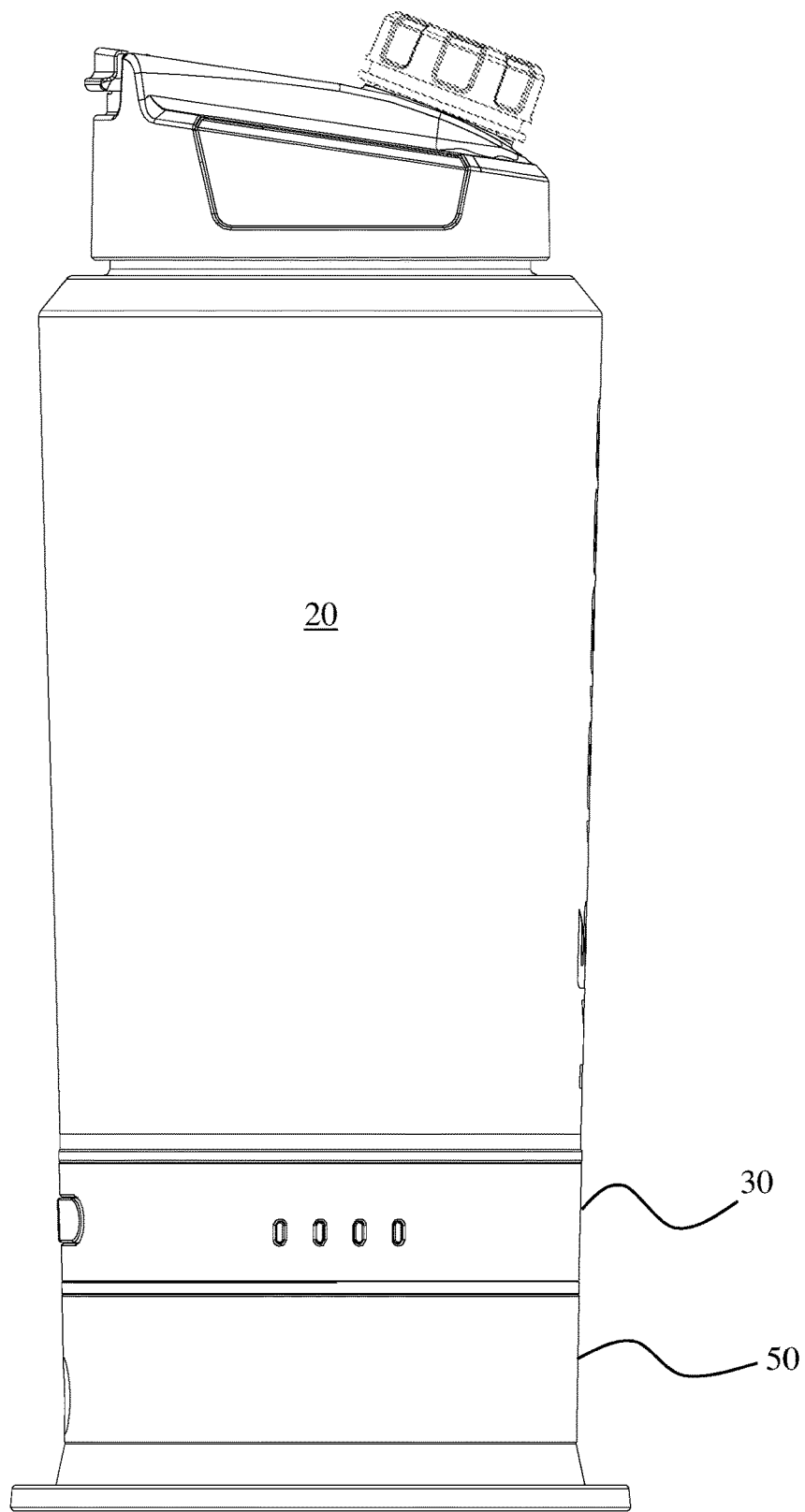
FIG. 6E is a left side elevation view of the embodiment illustrated in FIG. 6D.
Figure 6F:
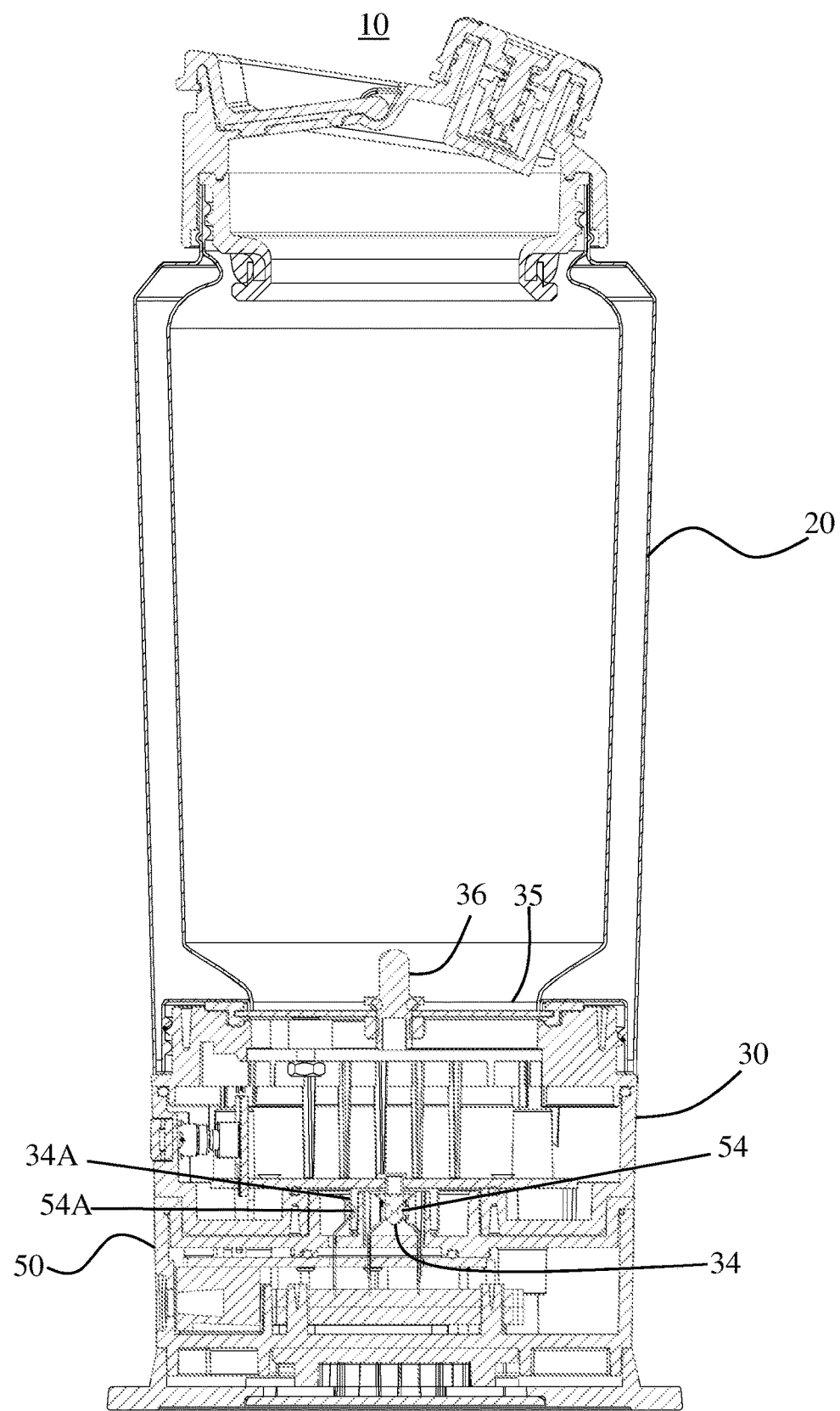
FIG. 6F is a left side cut away view of the embodiment illustrated in FIG. 6D.

For example, the module 50 of at least one embodiment includes a connection end 58 which is structured to interconnect with or otherwise at least partially receive the connection assembly 38 of the heating assembly 30. For instance, connection end 58 of the module 50 may include a recesses 58A within which the connection assembly 38 or a portion of the heating assembly 30 may sit or reside. In at least one embodiment, as illustrated in FIG. 6B, the recess 58A of the module 50 may not include any flanges (such as flanges 48B of the battery module 40). In such a case, the heating assembly 30 and/or container 10 is able to be easily lifted out of the module 50 such that the module 50 may remain seated on a support surface such as a desk top or counter top. This allows a user to lift the container off of the module 50, for example, in order to drink out of the container or pour contents from the container, and subsequently seat the container back upon the module 50 in order to resume heating.

Accordingly, in some embodiments, the container, heating assembly 30 and/or module 50 may include a memory chip or memory capabilities such that the container and/or heating assembly 30 is lifted off of the module 50, and then subsequently return to the module 50 such that an electrical connection is reestablished between the heating assembly 30 and the module 50, the previous settings (e.g., the previously selected temperature range) does not need to be re-entered by the user.

Other embodiments may include one or more flanges (not shown in FIG. 6B) such that the module 50 may lock within the heating assembly 30, in a similar manner as the battery module 40 discussed herein.

Furthermore, as shown in the top view of FIG. 6B, the module 60 includes at least one electrical connection 54, 54A configured to receive or otherwise electrically connect with the electrical connection 34, 34A of the heating assembly 30. In the embodiment illustrated, the connections 54 of the module 50 includes at least two prongs or electrical connections within which the electrical connection 34 or prong(s) of the heating assembly 30 can be disposed. An outer peg or electrical connection 54A of at least one embodiment is structured to engage or contact ring 34A. Upon doing so, the electrical connections 34, 54 of the heating assembly 30 and module 50, respectively, will electrically interconnect with one another thereby allowing the power or electricity from the module 50 to flow or transfer to the heating assembly 30. Also, as described above with regard to the module 40, this design allows the heating assembly 30 and/or module 50 to spin, twist or rotate (for example partially or 360 degrees) relative to one another without the electrical contacts being disconnected.

FIGS. 7A through 7F illustrate yet another embodiment of an additional or power source module 60. In this embodiment, a connection 61 is provided for connecting the module 50 to an external power source, such as a vehicle DC electrical outlet, for example, via an electrical or power cable (not shown). The external power source can then provide the power though a corresponding cable to the module 60, which in turn is electrically connected to the heating assembly 30. For instance, the module 60 illustrated in FIGS. 7A through 7F can be selectively connected or disconnected with the heating assembly 30 in the same manner as the module 40 described above and illustrated in FIGS. 5A through 5F.

For example, the module 60 of at least one embodiment includes a connection end 68 which is structured to interconnect with the connection assembly 38 of the heating assembly 30. For instance, connection end 68 of the module 60 may include a recesses 68A with one or more peripheral flanges 68B. With the connection assembly 38 of the heating assembly 30 disposed at least partially within the recess 68A, the one or more flanges 68B will engage or connect with the heating assembly 30, for example, upon twisting the connection assembly 38 relative to the module 50.

Figure 7A:
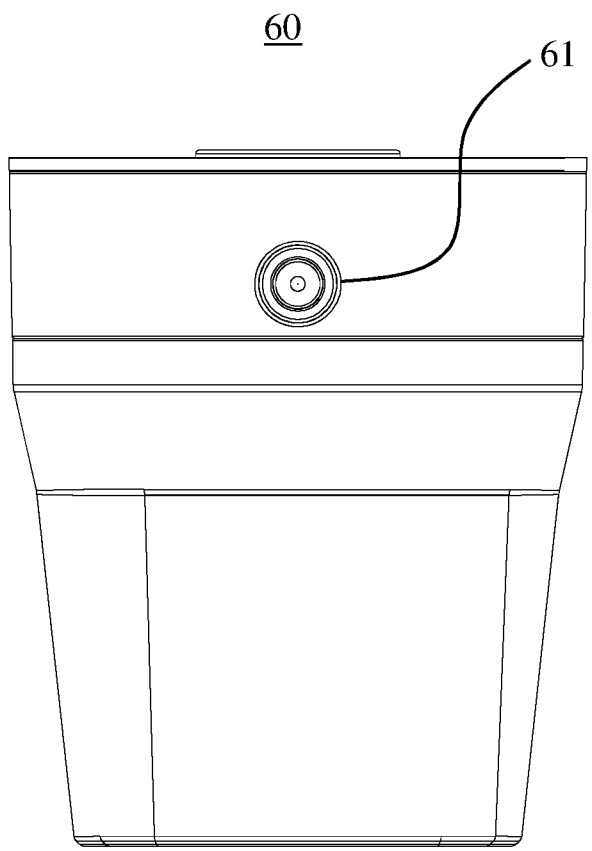
FIG. 7A is an elevation view of another exemplary power source module as disclosed in accordance with at least one embodiment of the present invention.
Figure 7B:
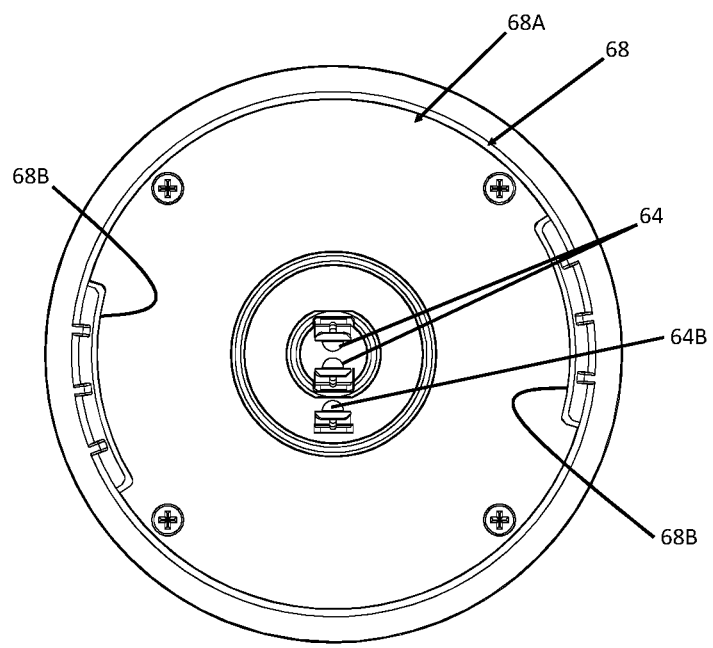
FIG. 7B is a top view of the exemplary power source module illustrated in FIG. 7A.
Figure 7C:
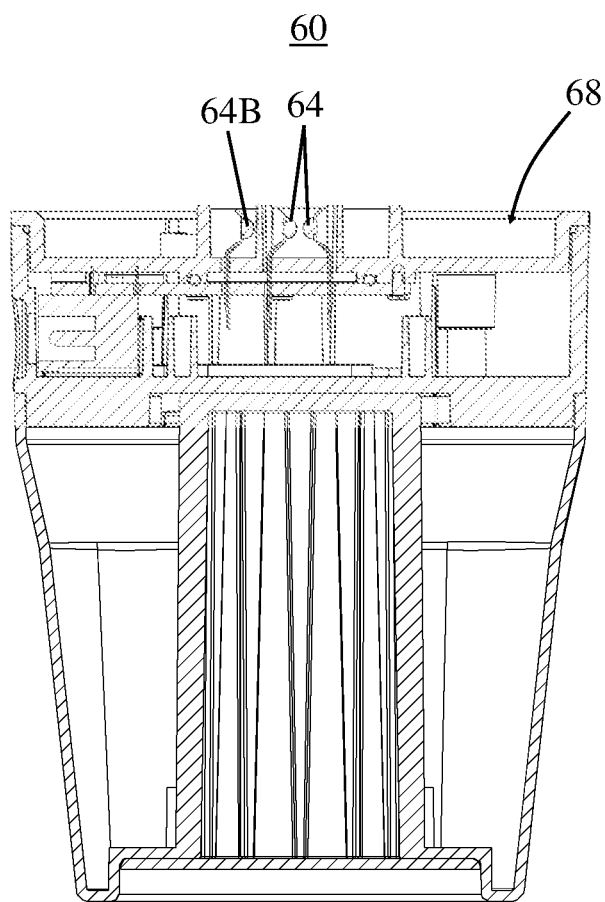
FIG. 7C is a cut away view of the exemplary power source module illustrated in FIG. 7A.
Figure 7D:
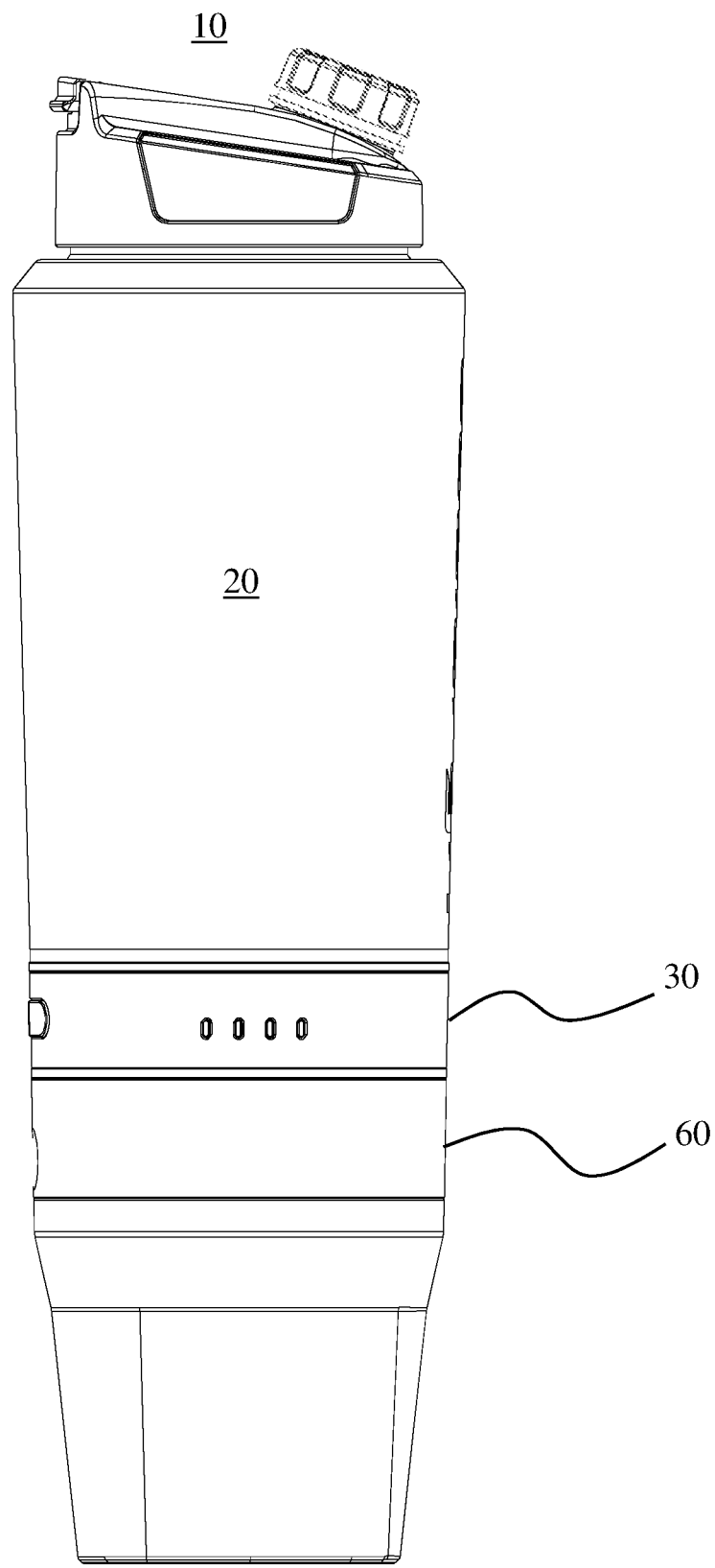
FIG. 7D is a left side elevation view of the container as disclosed in accordance with at least one embodiment of the present invention, including the main body portion, heating assembly, exemplary power source module and cap.
Figure 7E:
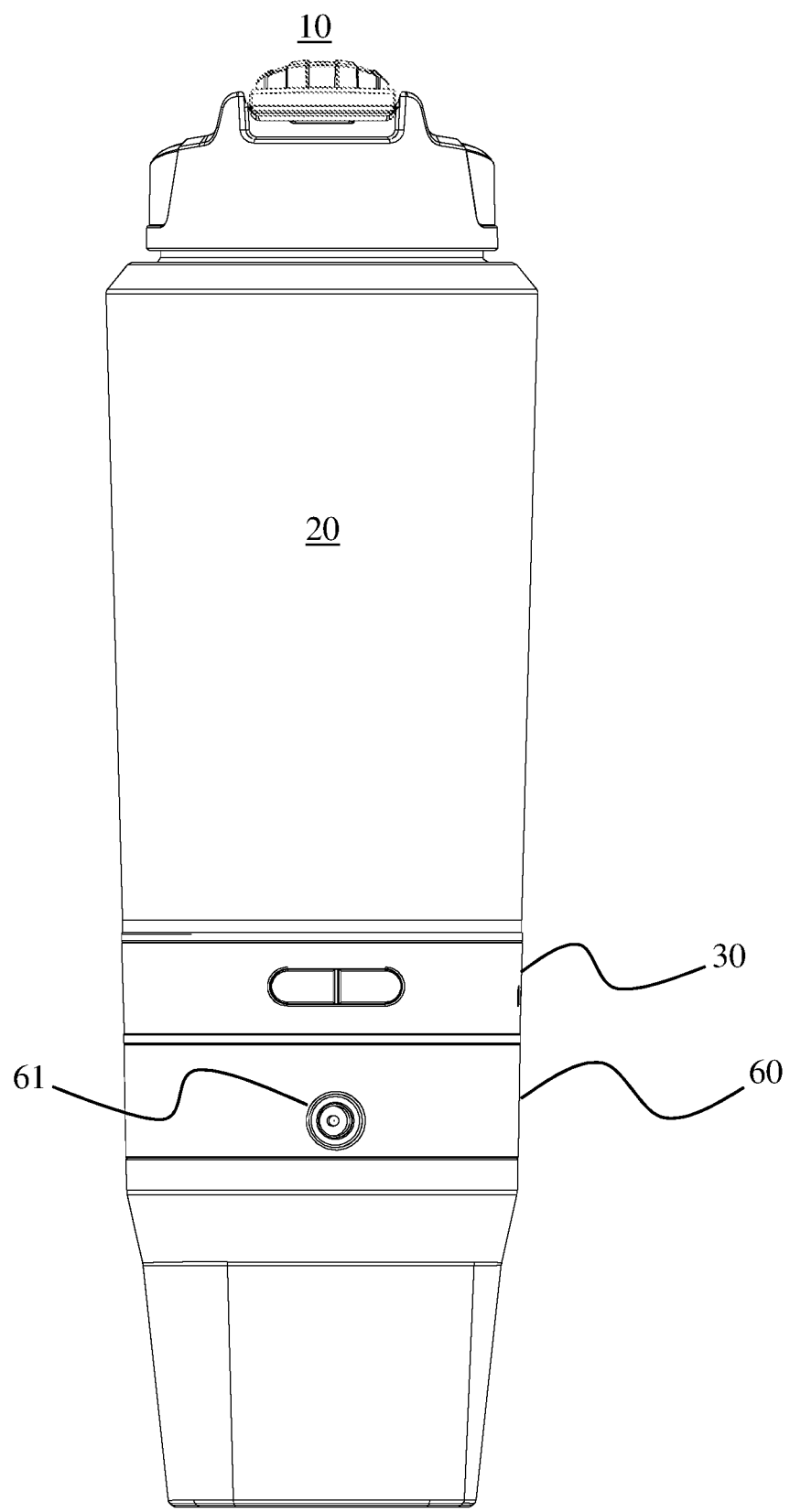
FIG. 7E is a rear elevation view of the embodiment illustrated in FIG. 7D.
Figure 7F:
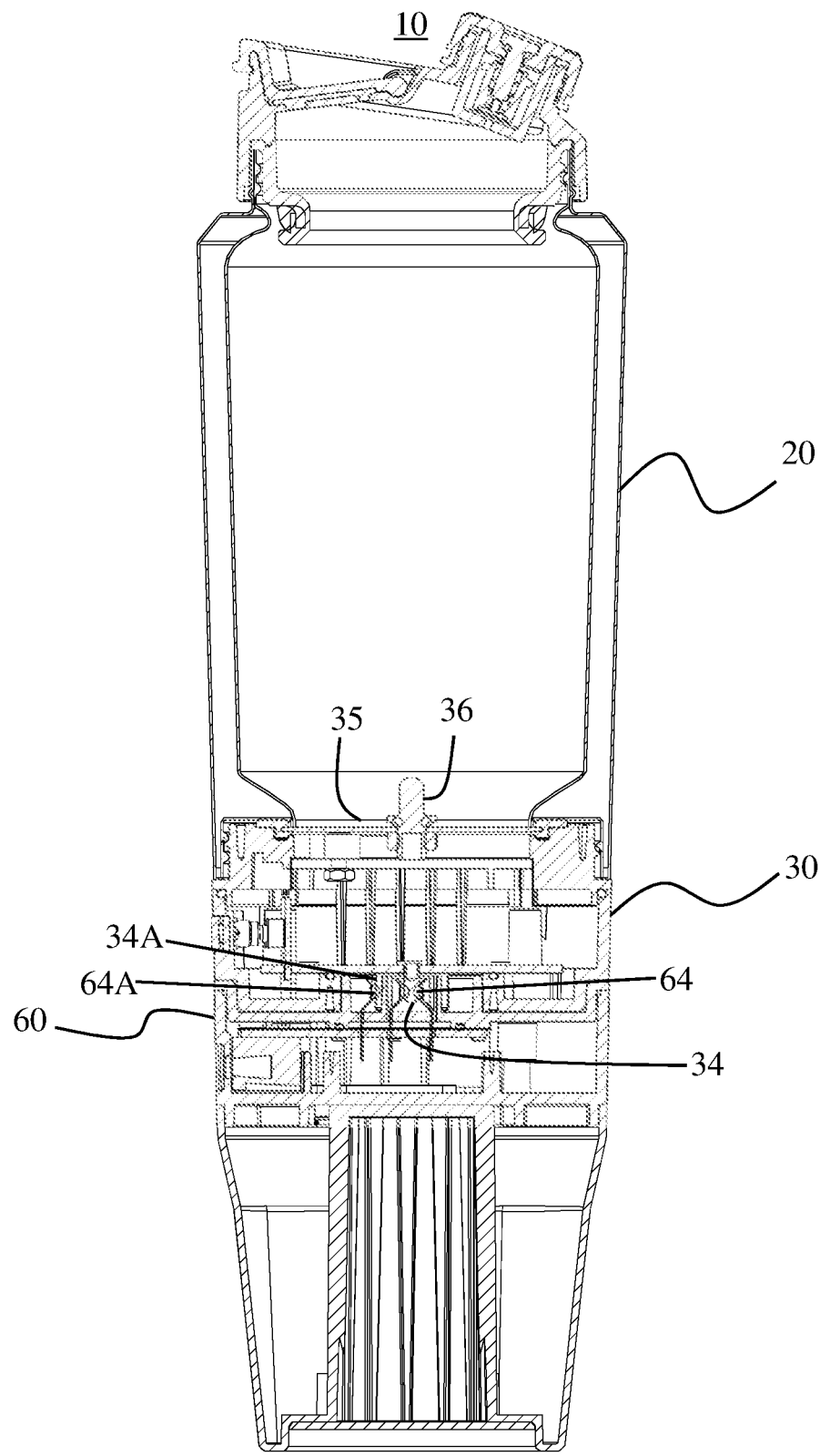
FIG. 7F is a left side cut away view of the embodiment illustrated in FIG. 7D.

Furthermore, as shown in the top view of FIG. 7B, the module 60 includes at least one electrical connection 64, 64A configured to receive or otherwise electrically connect with the electrical connection 34, 34A of the heating assembly 30. In the embodiment illustrated, the connection 64 of the module 60 includes at least two prongs within which the electrical connection 34 or prong(s) of the heating assembly 30 can be disposed. An outer peg or electrical connection 64A of at least one embodiment is structured to engage or contact ring 34A. Upon doing so, the electrical connections 34, 64 of the heating assembly 30 and module 60, respectively, will electrically interconnect with one another thereby allowing the power or electricity from the module 60 to flow or transfer to the heating assembly 30. Also, this design allows the heating assembly 30 and/or module 60 to spin, twist or rotate (for example partially or 360 degrees) relative to one another without the electrical contacts being disconnected.

In addition, the module 60 illustrated in FIG. 7A though 7F includes a specifically configured base or housing that can fit within a cup holder, for example, those commonly found in the cabin of a car or other vehicle. In use, the module 50 may sit within the cup holder while the cable is connected to the vehicle's power source, such as through the DC power supply cable. If desired, the user can selectively disconnect the main body portion 20 and the heating assembly 30 from the module 60, for example, via the twist and lock (or other) connection assembly. This can allow the user to drink from the container 10 while the module 60 remains seated within the cup holder or upon a table, counter, etc. Setting the heating assembly 30 back upon the module 60 will reconnect the electrical connections 34, 64, resuming heating operations.

Accordingly, in some embodiments, the heating assembly 30, and the connection assembly 38 thereof, need not be locked into place with the module 40, 50, 60 for the module 40, 50, 60 to operate and/or otherwise to deliver power or electricity from the module 40, 50, 60 to the heating assembly 30. Furthermore, in some embodiments, the container 10 includes a memory component in order to store the selected settings or modes. For example, when the main body portion 20 is removed from the module 40, 50 60 and then returned to the module 40, 50 60, when it is returned to the module 40, 50, 60 and reconnected, the heating assembly 30 will remember the prior selected settings or modes (e.g., temperature range(s)) and continue to heat the contents of the container 10 according to those settings or modes.

Referring now to FIGS. 8A through 11B, the present invention also includes a novel cap, generally referenced as 100. In particular, the cap 100 of at least one embodiment is configured to be removably attached or connected to the main body portion 20 of the container, for example, via cooperative threaded components or other like attachment assemblies. One or more gaskets may be provided on the cap 100 or on the main body portion 20 of the container 10, for example, on a threaded neck portion thereof, in order to provide a liquid tight seal between the cap 100 and the body 20.

In any event, the cap 100 of at least one embodiment may include dual dispensing openings 110, 120 in that the cap 100 may include at least two separate openings 110, 120, each of which are structured and configured to allow independent dispensing of fluid from the container 10. The first opening in at least one embodiment may often be used to drink hot liquids from the container 10 although liquids of any temperature can be dispensed or consumed through either of the two or more openings 110, 120.

For instance, one of the at least two separate openings, such as a first opening 110, includes a pivoting closure device 112 allowing for the corresponding opening 110 to be selectively opened or closed. The closure device 112 may pivot upon the cap 100 at pivot point 112A in order to selectively open and close the opening 110. The closure device 112 may include a stopper or plug 112B that fits at least partially within the opening 110 in order to provide a liquid tight seal when closed.

Furthermore, an inlet hole 110A may be included in order to facilitate the pouring or consuming of liquid from the container. The inlet hole 110A allows air to enter the container 10 such that the liquid can freely flow out of the container 10 through opening 110. In this manner, the closure device 112 may also include a stopper or plug 112C that correspondingly fits within the inlet hole 110A when the closure device is pivoted into the closed position, as shown in the cut-away view of FIG. 8B.

In addition, the closure device 112 of at least one embodiment may include a lip 112D on an outer end thereof for engagement into a corresponding groove on an outwardly facing surface of the cap 100. When the closure device 112 is closed, the lip 112D will engage within the groove providing a tight engaging fit. Pulling on the closure device 112 with force sufficient to remove the lip 112D from the groove will allow the closure device 112 to be pivoted upward to open the opening 110.

The cap 100 may also include another or second opening 120, which, as provided above, may be useful for pouring liquid, such as a cold liquid, from the container 10. The second opening 120 also includes a closure device 122. The closure device 122 of at least one embodiment may include threaded components 124 that cooperate with threaded components 102 on an extended neck portion 101 of the cap 100. Particularly, with reference to FIGS. 11B and 9C, the closure device 120 of one embodiment includes threaded components 120 on an inside surface thereof that fit with the threaded components 102 on the outside surface of neck portion 101. In this regard, in order to open and/or close opening 120, the closure 122 can be screwed off and/or on, respectively.

Figure 8A:
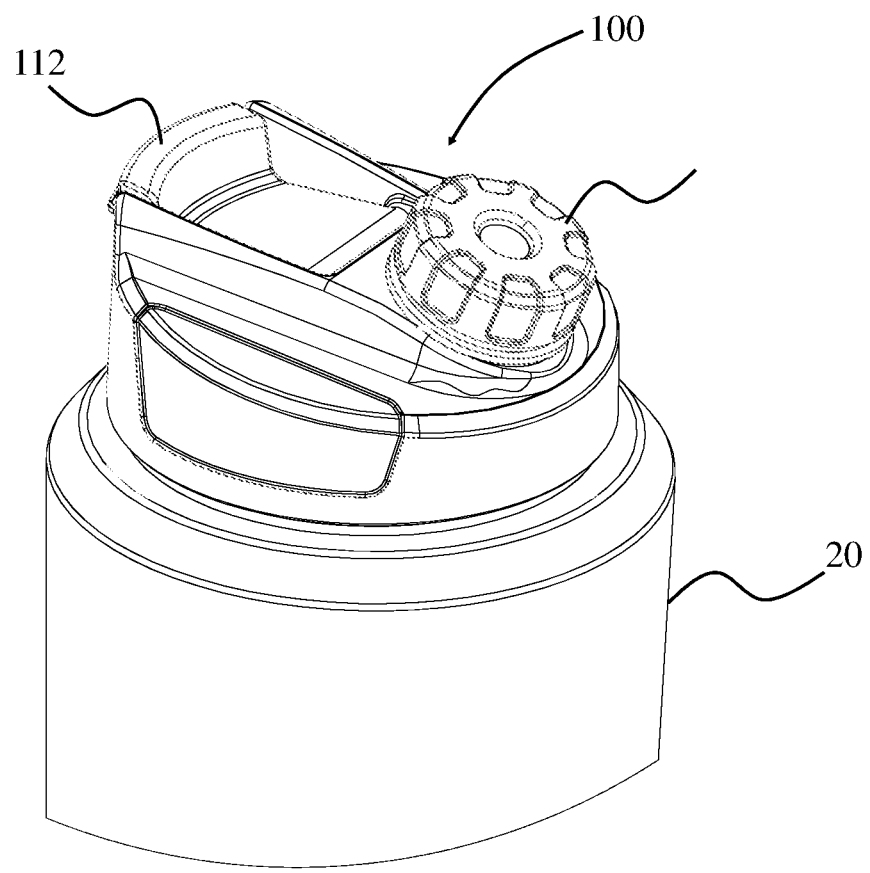
FIG. 8A is a partial perspective view of the cap and body portion of at least one embodiment of the present invention.
Figure 8B:
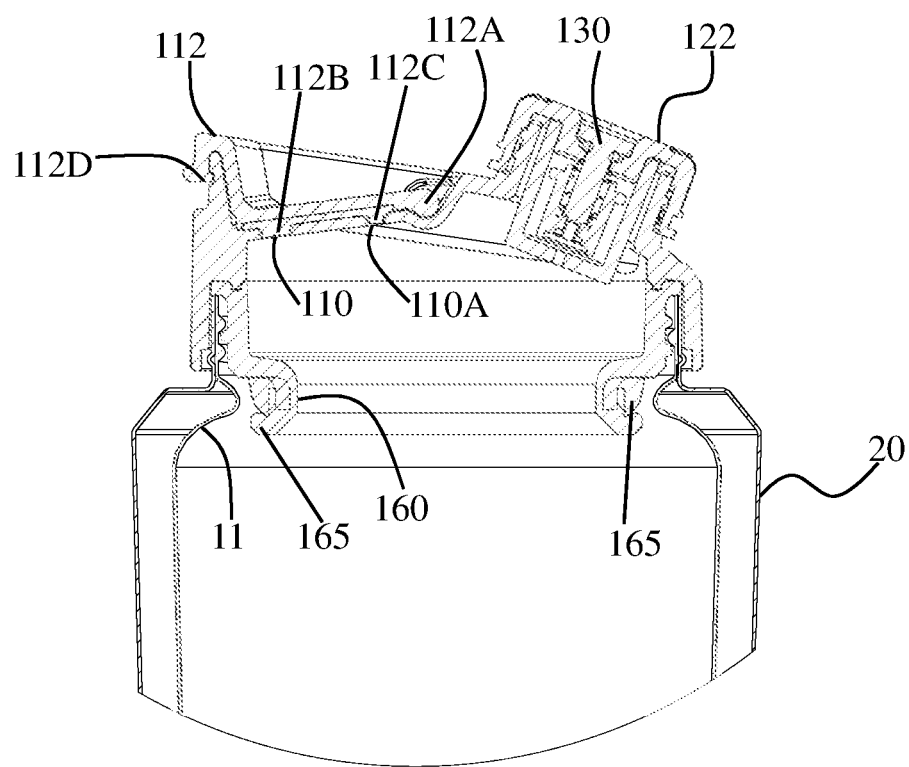
FIG. 8B is a cut away view of the embodiment illustrated in FIG. 8A.
Figure 9A:
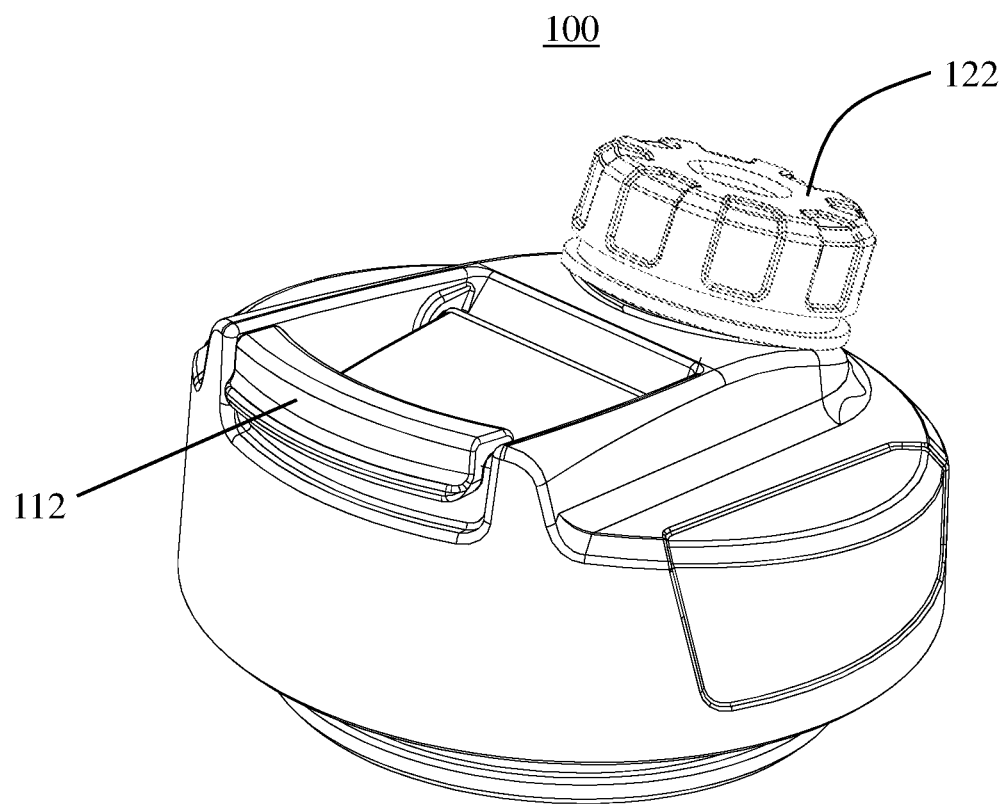
FIG. 9A is a perspective view of the cap of at least one embodiment of the present invention.
Figure 9B:
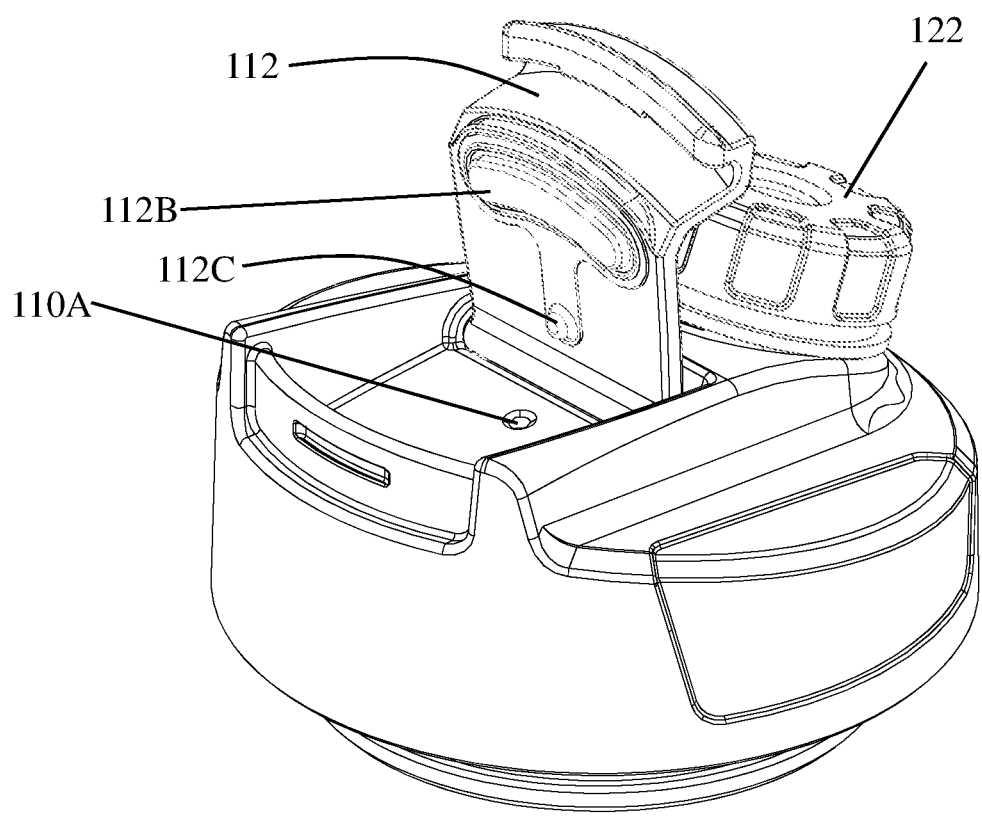
FIG. 9B is another perspective view of the cap illustrated in FIG. 9A.
Figure 9C:
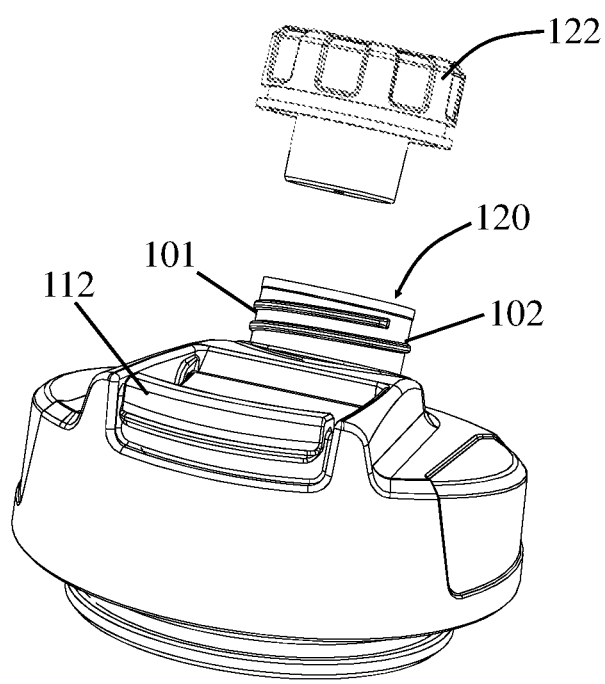
FIG. 9C is a perspective and partially exploded view of the cap illustrated in FIGS. 9A and 9B.

Additional features of the closure device 122 of at least one embodiment include a pressure release valve, generally referenced as 130 in the cut away view of FIG. 8B. In particular, the pressure release valve 130 is structured to allow vapor and/or steam to escape from the inside of the container, for example, via hole or aperture 132 and through valve 130.

Moreover, at least one embodiment of the cap 100 may also a tether (not shown) which can be secured around the circumference of the cap 100 or container 10, and one or more of the closure devices, such as the screw cap closure device 122. In this manner, when the screw cap closure device 122 is removed from the corresponding opening 120, the tether can be used to retain the closure device 122 connected to the cap 100 or container 10 such that it cannot be lost or misplaced. As an example, the tether can be constructed of a flexible rubber, plastic or other like material and secured to the closure device 122 and the cap 100 or container 10. It should also be noted that the tether of at least one embodiment can also be used as a handle for carrying the container or securing the container to an external item, if desired.

Figure 10:
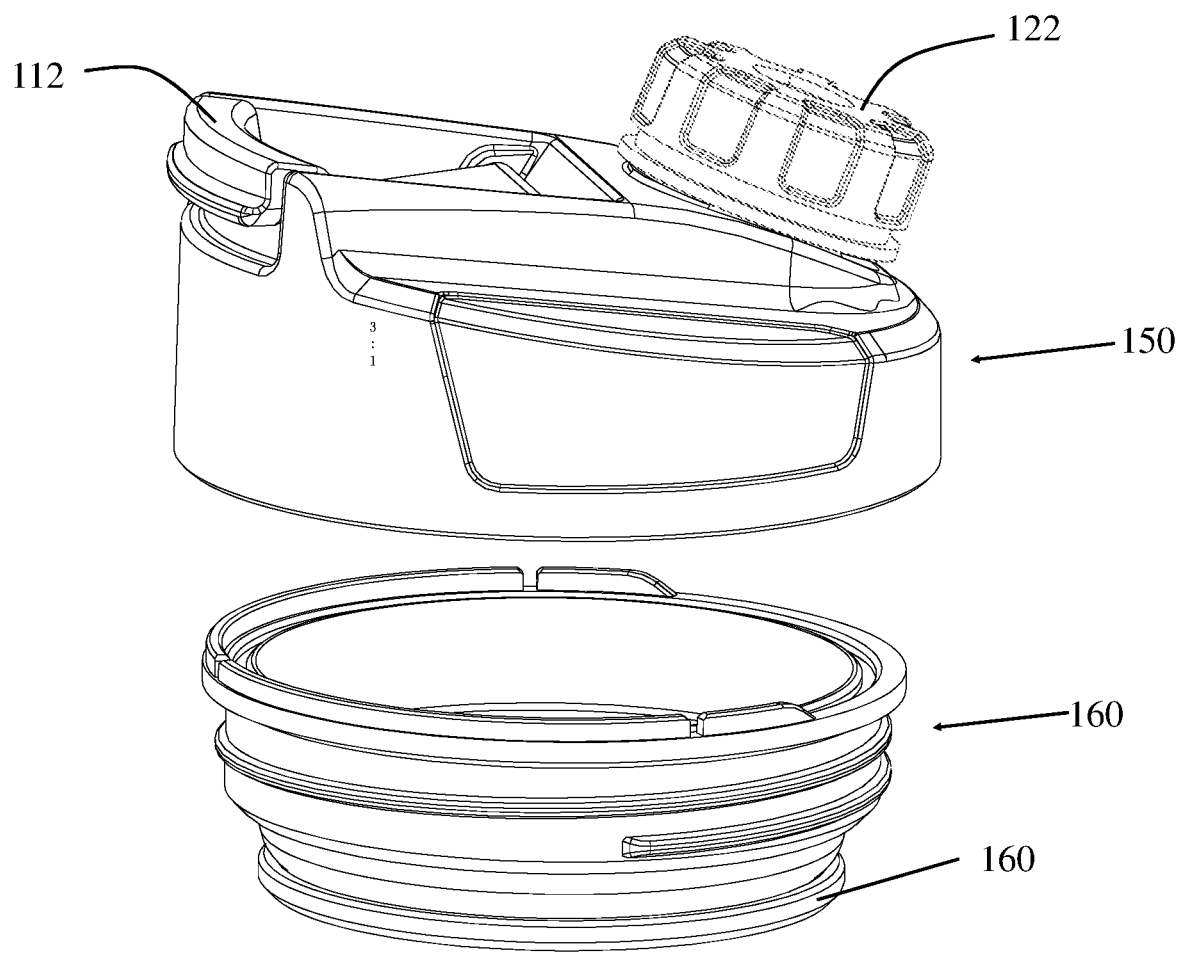
FIG. 10 is a partially exploded view of the cap as disclosed in accordance with at least one embodiment of the present invention.
Figure 11A:
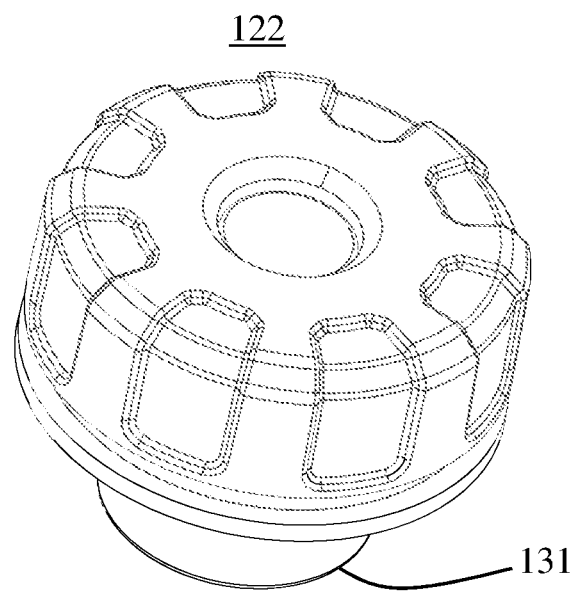
FIG. 11A is a top perspective view of the second closure device as disclosed in accordance with at least one embodiment of the present invention.
Figure 11B:
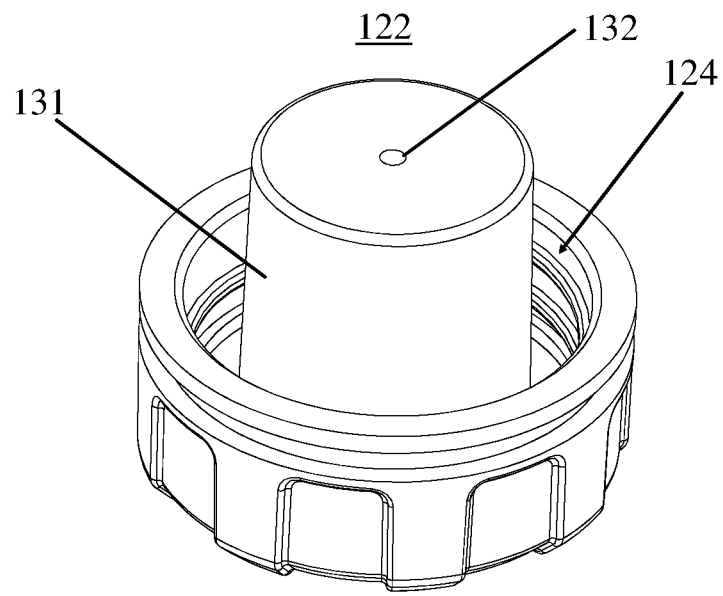
FIG. 11B is a bottom perspective view of the closure device illustrated in FIG. 11A.

As shown in FIG. 10, at least one embodiment of the cap 100 includes two portions, a main top portion 150 and an inner connection portion 160. The inner connection portion 160 is connected to the inside of the main top portion 150 and includes a threaded component or base rim 165 that cooperates with the neck portion 11 of the main body portion 20 of the container 10. In this manner, the inner connection portion 160 of the cap 100 can be selectively removably coupled or attached to the neck 11 of the main body portion 20 of the container 10 in order to open and closed the top end 22A thereof.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described,

What is claimed is:

1. A portable heating container, comprising:
    a body, said body comprising a double wall construction defined by an inner wall and an outer wall, said inner wall and said outer wall being sealed proximate a top and a bottom portion of said body,
    said body further comprising at least partially open top end and at least partially open bottom end forming the body of the portable heating container,
    a top cap removably connected to said at least partially open top end of said body, said top cap being configured to selectively allow dispensing of contents disposable within said body,
    a heating assembly connected to the at least partially open bottom end of said body, said heating assembly comprising at least one heating element and a controller, said at least one heating element being at least partially disposed within said at least partially open bottom end of said body, wherein said at least one heating element is disposed in direct contact with contents disposable within said body,
    at least one attachment includes a plurality of batteries electrically interconnected to the heating assembly;
    wherein the controller configured to select a temperature setting from at least four temperature settings, and control the electricity supplying to the at least one heating element from the plurality of batteries according to the temperature setting, wherein the at least four temperature settings in a temperature range from 104 degree Fahrenheit to 212 degree Fahrenheit; and
    said heating assembly comprising a connection assembly including a prong or probe that extends downward and an outer ring that at least partially or completely encircles or surrounds the prong, the prong and ring are constructed of a metal or metallic material configured to connect to the at least one attachment connected to the body of the portable heating container and electrically interconnected to the bottom of the heating assembly.

2. The portable heating container as recited in claim 1 wherein said controller configured to control the at least one heating element.

3. The portable heating container as recited in claim 2 wherein said at least four temperature settings corresponding to at least four different heating modes to control the at least one heating element and a temperature of fluid contained in said body.

4. The portable heating container as recited in claim 3 wherein at least one of said at least four heating modes is a boiling point heating mode for controlling fluid contents disposable within said body to a boiling point.

5. The portable heating container as recited in 1 wherein said plurality of batteries comprises at least one rechargeable battery.

6. The portable heating container as recited in claim 1 wherein said plurality of batteries is comprising at least 2600 milliamperes (mAh).

7. The portable heating container as recited in claim 6 wherein said plurality of batteries is comprising one or more rechargeable lithium ion batteries.

8. The portable heating container as recited in claim 1 further comprising at least one of a plurality of interchangeable attachment connected to said heating assembly.

9. The portable heating container as recited in claim 8 wherein said plurality of attachment comprises at least one battery and at least one power connection being adapted to receive power from an external power source.

10. The portable heating container as recited in claim 1 wherein said top cap comprise at least two separate openings each of said at least two separate independent fluid content dispensing openings within said body.

11. The portable heating container as recited in claim 10 wherein a first one of said at least two separate openings of said top cap comprises an opening and sealing pivoting closure device.

12. The portable heating container as recited in claim 11 wherein a second one of said at least two separate openings of said top cap comprises an opening and sealing screw cap closure device.

13. The portable heating container as recited in claim 12 wherein said screw cap closure device comprises a pressure release valve assembly.

14. A portable container adapted to retain, heat and dispense fluid content disposable therein, said portable container comprising:

an elongated cylindrical body comprising an interior portion and an at least partially open top end, a top cap removably connected to said at least partially open top end of said body, said top cap being configured to selectively allow dispensing of the fluid content disposable within said body, a heating assembly connected to a bottom of said body, said heating assembly comprising at least one heating element and a controller, wherein said at least one heating element is directly exposed to said interior portion of said body wherein said at least one heating element is disposable in direct contact with fluid content disposable within said body, at least one attachment includes a plurality of batteries electrically interconnected to the heating assembly;

wherein the controller configured to select a temperature setting from at least four temperature settings, and control the electricity supplying to the at least one heating element from the plurality of batteries according to the at least four temperature settings, wherein the at least four temperature settings in a temperature range from 104 degree Fahrenheit to 212 degree Fahrenheit; one of the at least four temperature settings including a boiling temperature of a fluid content disposable within said interior portion of said body; and said heating assembly comprising a connection assembly including a prong or probe that extends downward and an outer ring that at least partially or completely encircles or surrounds the prong, the prong and ring are constructed of a metal or metallic material configured to connect to the at least one attachment connected to the body of the portable heating container and electrically interconnected to the bottom of the heating assembly.

15. The portable container as recited in claim 14 wherein said power source comprises at least one rechargeable battery.

16. The portable container as recited in claim 14 further comprising said power source comprises a power connection cable is adapted to obtain power from an external power source.

* * * * *